US011803798B2

(12) United States Patent
Ramanathan et al.

(10) Patent No.: US 11,803,798 B2
(45) Date of Patent: Oct. 31, 2023

(54) SYSTEM AND METHOD FOR AUTOMATIC GENERATION OF EXTRACT, TRANSFORM, LOAD (ETL) ASSERTS

(71) Applicant: ORACLE INTERNATIONAL CORPORATION, Redwood Shores, CA (US)

(72) Inventors: Krishnan Ramanathan, Bengaluru (IN); Gangadhar Ronanki, Bengaluru (IN); Aman Madaan, Pittsburgh, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/851,869

(22) Filed: Apr. 17, 2020

(65) Prior Publication Data
US 2020/0334267 A1 Oct. 22, 2020

(30) Foreign Application Priority Data

Apr. 18, 2019 (IN) .............................. 201941015571
Apr. 18, 2019 (IN) .............................. 201941015572
(Continued)

(51) Int. Cl.
*G06F 16/27* (2019.01)
*G06Q 10/0637* (2023.01)
(Continued)

(52) U.S. Cl.
CPC ..... *G06Q 10/06375* (2013.01); *G06F 16/211* (2019.01); *G06F 16/254* (2019.01);
(Continued)

(58) Field of Classification Search
CPC .... G06F 16/211; G06F 16/283; G06F 16/254; G06F 17/18
See application file for complete search history.

(56) References Cited

U.S. PATENT DOCUMENTS 7,151,438 B1   12/2006   Hall et al.
7,974,896 B2   7/2011    Busse et al.
(Continued)

FOREIGN PATENT DOCUMENTS

EP   3352103   7/2018

OTHER PUBLICATIONS

Transforming Statistical Linked Data for Use in OLAP Systems, Benedikt Kämpgen and Andreas Harth, Sep. 2011, pp. 33-36, Fig. 2 https://dl.acm.org/doi/10.1145/2063518.2063523.*

(Continued)

*Primary Examiner* — Mariela Reyes
*Assistant Examiner* — Courtney Harmon
(74) *Attorney, Agent, or Firm* — TUCKER ELLIS LLP

(57) ABSTRACT

In accordance with an embodiment, described herein are systems and methods for use with an analytic applications environment, for automatic generation of asserts in such environments. A data pipeline or process, such as, for example an extract, transform, load (ETL) process, can operate in accordance with an analytic applications schema adapted to address particular analytics use cases or best practices, to receive data from a customer's (tenant's) enterprise software application or data environment, for loading into a data warehouse instance. Each customer (tenant) can additionally be associated with a customer tenancy and a customer schema. During the process of populating a data warehouse instance, the system can automatically generate dynamic data-driven ETL asserts, including determining a list of columns for tables in the data warehouse; determining (Continued)

a data type for each column; generating an assert for each determined data type; validating the generated assert; and maintaining the generated assert.

20 Claims, 18 Drawing Sheets

(30) Foreign Application Priority Data

Apr. 18, 2019 (IN) .............................. 201941015582
Apr. 18, 2019 (IN) .............................. 201941015583

(51) Int. Cl.
*G06F 16/28* (2019.01)
*G06Q 30/0201* (2023.01)
*G06N 5/04* (2023.01)
*G06F 16/21* (2019.01)
*G06F 16/25* (2019.01)
*G06F 17/18* (2006.01)

(52) U.S. Cl.
CPC ............ *G06F 16/27* (2019.01); *G06F 16/283* (2019.01); *G06F 17/18* (2013.01); *G06N 5/04* (2013.01); *G06Q 30/0201* (2013.01); *G06Q 30/0206* (2013.01)

(56) References Cited

U.S. PATENT DOCUMENTS

| | | | |
|---|---|---|---|
| 8,010,426 | B2 | 8/2011 | Kopp et al. |
| 8,386,419 | B2 | 2/2013 | Yalamanchilli |
| 8,775,372 | B2 | 7/2014 | Dary |
| 8,983,914 | B2 | 3/2015 | Kung et al. |
| 9,430,505 | B2 | 8/2016 | Padmanabhan et al. |
| 9,460,188 | B2 | 10/2016 | Mundlapudi et al. |
| 9,971,819 | B2 | 5/2018 | Bender |
| 10,055,431 | B2 | 8/2018 | Marrelli et al. |
| 10,110,390 | B1* | 10/2018 | Nguyen ................... G06F 8/315 |
| 10,997,129 | B1* | 5/2021 | Nanda ................... G06F 16/122 |
| 2002/0178077 | A1 | 11/2002 | Katz et al. |
| 2008/0195430 | A1 | 8/2008 | Rustagi |
| 2008/0250057 | A1 | 10/2008 | Rothstein et al. |
| 2012/0089564 | A1* | 4/2012 | Bakalash .......... G06F 16/24556 707/602 |
| 2012/0191642 | A1* | 7/2012 | George ............. G06F 16/24534 707/718 |
| 2012/0310875 | A1* | 12/2012 | Prahlad ............... G06F 16/2465 707/602 |
| 2013/0166515 | A1 | 6/2013 | Kung et al. |
| 2014/0164033 | A1 | 6/2014 | Baskaran et al. |
| 2014/0349272 | A1 | 11/2014 | Kutty et al. |
| 2015/0256475 | A1 | 9/2015 | Suman et al. |
| 2016/0224803 | A1* | 8/2016 | Frank .................. G06F 21/6245 |
| 2016/0306827 | A1 | 10/2016 | Dos Santos et al. |
| 2017/0104627 | A1 | 4/2017 | Bender et al. |
| 2017/0249361 | A1* | 8/2017 | Gordon ............... G06F 16/9024 |
| 2018/0150529 | A1 | 5/2018 | McPherson et al. |
| 2020/0334240 | A1* | 10/2020 | Muralidhar ....... G06F 16/24557 |

OTHER PUBLICATIONS

"Cross-tenant analytics using extracted data—single-tenant app", published Dec. 18, 2018, retrieved from https://docs.microsoft.com/en-us/azure/sql-database/saas-tenancy-tenant-analytics on Dec. 5, 2019, 15 pages.

"ETL Validator: Key Features", retrieved from https://www.datagaps.com/etl-testing-tools/etl-validator/ on Nov. 27, 2019, 2 pages.

Gawande, Sandesh; "ETL Strategy for the Enterprise: ETL Startegy to store data validation rules", ETLGuru, retrieved from http://etlguru.com/?p=22 on Nov. 27, 2019, 2 pages.

Homayouni, Hajar; "An Approach for Testing the Extract-Transform-Load Process in Data Warehouse Systems", Thesis, Fall 2017, Colorado State University, 96 pages.

Kim, et al., "A Component-Based Architecture for Preparing Data in Data Warehousing", Jun. 2000, retrieved from https://www.researchgate.net/profile/Eui_Hong2/publication/2466873_A_Component-Based_Architecture_for_Preparing_Data_in_Data_Warehousing/links/541be8930cf25ebee98dac5c/A-Component-Based-Architecture-for-Preparing-Data-in-Data-Warehousing.pdf, 8 pages.

"Making cloud ETL routines work", The Chartered Institute for IT, published Sep. 6, 2017, retrieved from https://www.bcs.org/content-hub/making-cloud-etl-routines-work/ on Dec. 5, 2019, 4 pages.

Ong, et al., "Dynamic-ETL: a hybrid approach for health data extraction, transformation and loading", published on Sep. 13, 2017, retrieved from https://www.ncbi.nlm.nih.gov/pmc/articles/PMC5598056/ on Nov. 27, 2019, 10 pages.

Subash, Muthiah; "An Approach to Multi-Tenant Customer Data Isolation Using SQL Server and Tableau 8.1", published Jun. 18, 2014, retrieved from https://www.credera.com/blog/business-intelligence/approach-multi-tenant-customer-data-isolation-using-sql-server-tableau-8-1/, 6 pages.

"Use Power BI with SQL Data Warehouse", Engineering ME366, Boston University Academy, retrieved from https://www.coursehero.com/file/p25tovsh/Scored-Labels-the-classification-done-by-the-model-bike-buyer-1-or-not-0-This/ on Nov. 27, 2019, 1 page.

* cited by examiner

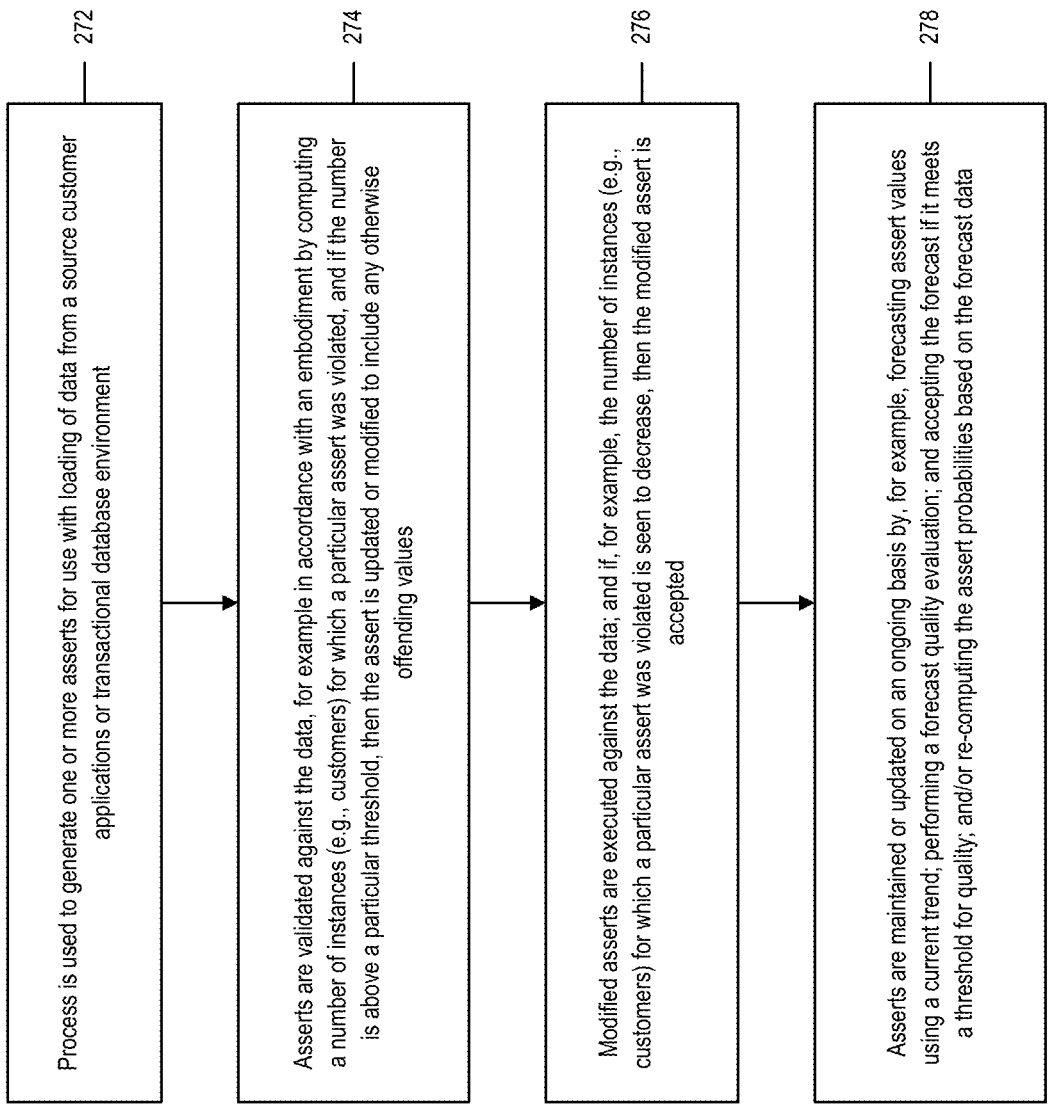

SYSTEM AND METHOD FOR AUTOMATIC GENERATION OF EXTRACT, TRANSFORM, LOAD (ETL) ASSERTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to India Provisional Patent Application titled "SYSTEM AND METHOD FOR AUTOMATIC GENERATION OF EXTRACT, TRANSFORM, LOAD (ETL) ASSERTS", Application No. 201941015571, filed Apr. 18, 2019; India Provisional Patent Application titled "SYSTEM AND METHOD FOR RANKING OF EXTRACT, TRANSFORM, LOAD (ETL) ALERTS", Application No. 201941015572, filed Apr. 18, 2019; India Provisional Patent Application titled "SYSTEM AND METHOD FOR OPTIMIZATION OF VIRTUAL MACHINES FOR EXTRACT, TRANSFORM, LOAD (ETL)", Application No. 201941015582, filed Apr. 18, 2019; and India Provisional Patent Application titled "SYSTEM AND METHOD FOR DETERMINATION OF RECOMMENDATIONS AND ALERTS IN AN ANALYTICS ENVIRONMENT", Application No. 201941015583, filed Apr. 18, 2019; each of which above applications are herein incorporated by reference.

TECHNICAL FIELD

Embodiments described herein are generally related to computer data analytics, computer-based methods of providing business intelligence data, and systems and methods, for use with an analytic applications environment, for automatic generation of extract, transform, load (ETL) asserts in such environments.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

During the loading of data, from one or more data sources, to a data warehouse or other database, there may be a need to prepare the data in some manner; for example by extracting the data from a highly-normalized transactional system data source, and transforming the data into one or more data warehouse or database schemas that support analytic querying and business intelligence processes.

For example, an Extract, Transform, and Load (ETL) process can be used to extract data from a source database, pass the data through a middle-tier transformation server, and then transform the data into a schema suitable for use in a data warehouse. During such process, data that may need to be looked-up from the target database can be cached on a local server. Once the data is transformed locally, it can be loaded into the target database.

However, ETL processes can be complex and prone to errors; and failures may result, for example, due to erroneous configuration; erroneous data mapping across different formats, such as, for example from a tab-separated values (TSV) format to a comma-separated values (CSV) format; or corruption of intermediate files. Such factors can affect the quality of the data being converted and loaded into a data warehouse, and ultimately lead to inaccurate business intelligence information. In some environments, asserts can be used to help verify ETL data during the ETL process. However, asserts are challenging to implement in the verification of ETL processes, since it is generally not possible to program all assertions for an ETL process in an a-priori manner.

SUMMARY

In accordance with an embodiment, described herein are systems and methods for use with an analytic applications environment, for automatic generation of asserts in such environments. A data pipeline or process, such as, for example an extract, transform, load (ETL) process, can operate in accordance with an analytic applications schema adapted to address particular analytics use cases or best practices, to receive data from a customer's (tenant's) enterprise software application or data environment, for loading into a data warehouse instance. Each customer (tenant) can additionally be associated with a customer tenancy and a customer schema. During the process of populating a data warehouse instance, the system can automatically generate dynamic data-driven ETL asserts, including determining a list of columns for tables in the data warehouse; determining a data type for each column; generating an assert for each determined data type; validating the generated assert; and maintaining the generated assert.

BRIEF DESCRIPTION OF THE DRAWINGS

FIG. 15 illustrates an example of various column data with value sets for a warehouse file, in accordance with an embodiment.

FIG. 16 illustrates another example of various column data with value sets for a warehouse file, in accordance with an embodiment.

FIG. 18 illustrates a flowchart of a method for generation, validation, and maintenance of dynamic data-driven asserts, in accordance with an embodiment.

DETAILED DESCRIPTION

Figure 1:
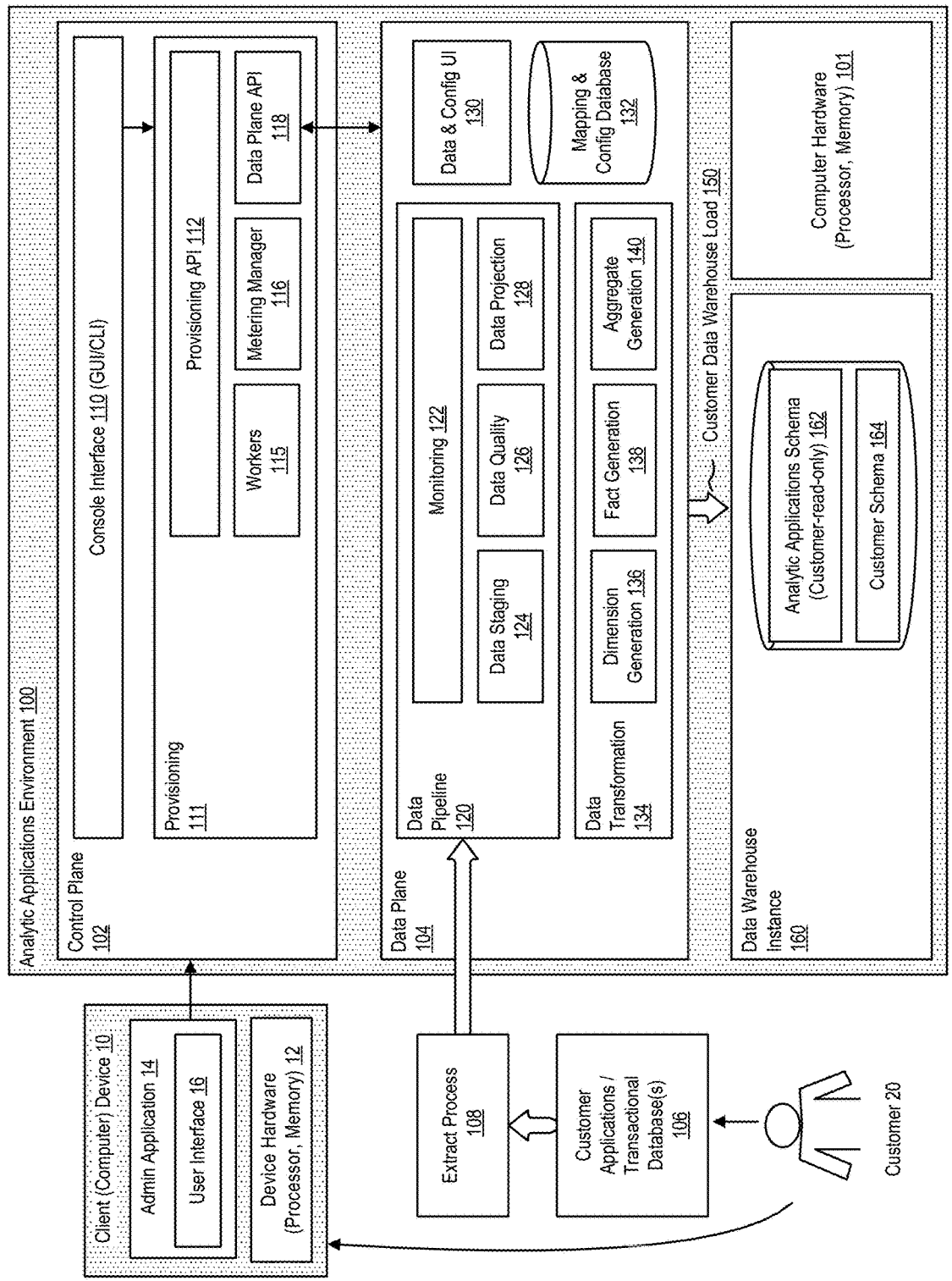
FIG. 1 illustrates a system for providing an analytic applications environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example an Oracle Fusion Applications environment or other type of enterprise software application or data environment; or within the context of a software-as-a-service (SaaS) or cloud environment, such as, for example an Oracle Analytics Cloud or Oracle Cloud Infrastructure environment, or other type of cloud environment.

In accordance with an embodiment, an analytic applications environment enables data analytics within the context of an organization's enterprise software application or data environment, or a software-as-a-service or other type of cloud environment; and supports the development of computer-executable software analytic applications.

A data pipeline or process, such as, for example an extract, transform, load process, can operate in accordance with an analytic applications schema adapted to address particular analytics use cases or best practices, to receive data from a customer's (tenant's) enterprise software application or data environment, for loading into a data warehouse instance.

Each customer (tenant) can additionally be associated with a customer tenancy and a customer schema. The data pipeline or process populates their data warehouse instance and database tables with data as received from their enterprise software application or data environment, as defined by a combination of the analytic applications schema, and their customer schema.

A technical advantage of the described systems and methods includes that the use of a system-wide or shared analytic applications schema or data model, maintained within an analytic applications environment (cloud) tenancy; together with tenant-specific customer schemas, maintained within customer tenancies; enables each customer's (tenant's) data warehouse instance, or database tables, to be populated or otherwise associated with live data (live tables), as received from their enterprise software application or data environment, on an automated or a periodic, e.g., hourly/daily/weekly, or other basis, and reflecting best practices for particular analytics use cases. Examples of such analytics use cases include Enterprise Resource Planning (ERP), Human Capital Management (HCM), Customer Experience (CX), Supply Chain Management (SCM), Enterprise Performance Management (EPM), or other types of analytics use cases. The populated data warehouse instance or database tables can then be used to create computer-executable software analytic applications, or to determine data analytics or other information associated with the data.

In accordance with an embodiment, a computer-executable software analytic application can be associated with a data pipeline or process, such as, for example an extract, transform, load (ETL) process, or an extract, load, transform (ELT) process, maintained by a data integration component, such as, for example, an Oracle Data Integrator (ODI) environment, or other type of data integration component.

In accordance with an embodiment, the analytic applications environment can operate with a data warehouse component, such as, for example an Oracle Autonomous Data Warehouse Cloud (ADWC) environment, or other type of data warehouse component adapted to store large amounts of data; which can be populated via a star schema sourced from an enterprise software application or data environment, such as, for example, an Oracle Fusion Applications, or other type of enterprise software application or data environment. The data made available to each customer (tenant) of the analytic applications environment can be provisioned in an ADWC tenancy that is associated with, and accessible only to, that customer (tenant); while providing access to other features of a shared infrastructure.

For example, in accordance with an embodiment, the analytic applications environment can include a data pipeline or process layer that enables a customer (tenant) to ingest data extracted from their Oracle Fusion Applications environment, to be loaded into a data warehouse instance within their ADWC tenancy, including support for features such as multiple data warehouse schemas, data extract and target schemas, and monitoring of data pipeline or process stages; coupled with a shared data pipeline or process infrastructure that provides common transformation maps or repositories.

Introduction

In accordance with an embodiment, a data warehouse environment or component, such as, for example an Oracle Autonomous Data Warehouse Cloud (ADWC) environment, or other type of data warehouse component adapted to store large amounts of data, can provide a central repository for storage of data collected by one or more business applications.

For example, the data warehouse environment or component can be provided as a multi-dimensional database that employs online analytical processing (OLAP) or other techniques to generate business-related data from multiple different sources of data. An organization can extract such business-related data from one or more vertical and/or horizontal business applications, and inject the extracted data into a data warehouse instance that is associated with that organization, Examples of horizontal business applications can include ERP, HCM, CX, SCM, and EPM, as described above, and provide a broad scope of functionality across various enterprise organizations.

Vertical business applications are generally narrower in scope that horizontal business applications, but provide access to data that is further up or down a chain of data within a defined scope or industry. Examples of vertical business applications can include medical software, or banking software, for use within a particular organization.

Although software vendors increasingly offer enterprise software products or components as SaaS or cloud-oriented offerings, such as, for example, Oracle Fusion Applications; while other enterprise software products or components, such as, for example, Oracle ADWC, can be offered as one or more of SaaS, platform-as-a-service (PaaS), or hybrid subscriptions; enterprise users of conventional business intelligence (BI) applications and processes generally face the task of extracting data from their horizontal and vertical business applications, and introducing the extracted data into a data warehouse—a process which can be both time and resource intensive.

In accordance with an embodiment, the analytic applications environment allows customers (tenants) to develop computer-executable software analytic applications for use with a BI component, such as, for example an Oracle Business Intelligence Applications (OBIA) environment, or other type of BI component adapted to examine large amounts of data sourced either by the customer (tenant) itself, or from multiple third-party entities.

For example, when used with a SaaS business productivity software product suite that includes a data warehouse component, the analytic applications environment can be used to populate the data warehouse component with data from the business productivity software applications of the suite. Predefined data integration flows can automate the ETL processing of data between the business productivity software applications and the data warehouse, which processing might have been conventionally or manually performed by the users of those services.

As another example, the analytic applications environment can be pre-configured with database schemas for storing consolidated data sourced across various business productivity software applications of a SaaS product suite. Such pre-configured database schemas can be used to provide uniformity across the productivity software applications and corresponding transactional databases offered in the SaaS product suite; while allowing the user to forgo the process of manually designing, tuning, and modeling the provided data warehouse.

As another example, the analytic applications environment can be used to pre-populate a reporting interface of a data warehouse instance with relevant metadata describing business-related data objects in the context of various business productivity software applications, for example to include predefined dashboards, key performance indicators (KPIs), or other types of reports.

Analytic Applications Environment

FIG. 1 illustrates a system for providing an analytic applications environment, in accordance with an embodiment.

As illustrated in FIG. 1, in accordance with an embodiment, an analytic applications environment 100 can be provided by, or otherwise operate at, a computer system having a computer hardware (e.g., processor, memory) 101, and including one or more software components operating as a control plane 102, and a data plane 104, and providing access to a data warehouse, or data warehouse instance 160.

The components and processes illustrated in FIG. 1, and as further described herein with regard to various other embodiments, can be provided as software or program code executable by a computer system or other type of processing device.

For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example an Oracle Analytics Cloud or Oracle Cloud Infrastructure environment, or other type of cloud environment.

For example, the control plane can include a console interface 110 that enables access by a client computer device 10 having a device hardware 12, administrative application 14, and user interface 16, under control of a customer (tenant) 20 and/or a cloud environment having a provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants).

For example, the console interface can provide interfaces that allow customers to provision services for use within their SaaS environment, and to configure those services that have been provisioned.

In accordance with an embodiment, the provisioning component can include various functionality to provision services that are specified by provisioning commands.

For example, the provisioning component can be accessed and utilized, via the console interface, by a customer (tenant) to purchase one or more of a suite of business productivity software applications, together with a data warehouse instance for use with those software applications.

A customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

The provisioning component can also comprise a provisioning application programming interface (API) 112, a number of workers 115, a metering manager 116, and a data plane API 118, as further described below. The console interface can communicate, for example, by making API calls, with the provisioning API when commands, instructions, or other inputs are received at the console interface to provision services within the SaaS environment, or to make configuration changes to provisioned services.

In accordance with an embodiment, the data plane API can communicate with the data plane.

For example, provisioning and configuration changes directed to services provided by the data plane can be communicated to the data plane via the data plane API.

In accordance with an embodiment, the metering manager can include various functionality that meters services and usage of services provisioned through control plane.

For example, the metering manager can record a usage over time of processors provisioned via the control plane, for particular customers (tenants), for billing purposes. Likewise, the metering manager can record an amount of storage space of data warehouse partitioned for use by a customer of the SaaS environment, for billing purposes.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse.

In accordance with an embodiment, the data pipeline or process, provided by the data plane, can including a monitoring component 122, a data staging component 124, a data quality component 126, and a data projection component 128, as further described below.

In accordance with an embodiment, the data transformation layer can include a dimension generation component 136, fact generation component 138, and aggregate generation component 140, as further described below. The data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

To support multiple tenants, the system can enable the use of multiple data warehouses or data warehouse instances.

For example, in accordance with an embodiment, a first warehouse customer tenancy for a first tenant can comprise a first database instance, a first staging area, and a first data warehouse instance of a plurality of data warehouses or data warehouse instances; while a second customer tenancy for a second tenant can comprise a second database instance, a second staging area, and a second data warehouse instance of the plurality of data warehouses or data warehouse instances.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data.

For example, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, based on the data model defined in the mapping and configuration database, the monitoring component can determine dependencies of several different data sets to be transformed. Based on the determined dependencies, the monitoring component can determine which of several different data sets should be transformed to the model format first.

For example, in accordance with an embodiment, if a first model dataset includes no dependencies on any other model data set; and a second model data set includes dependencies to the first model data set; then the monitoring component can determine to transform the first data set before the second data set, to accommodate the second data set's dependencies on the first data set.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

For example, dimensions can include categories of data such as, for example, "name," "address," or "age". Fact generation includes the generation of values that data can take, or "measures." Facts are associated with appropriate dimensions in the data warehouse instance. Aggregate generation includes creation of data mappings which compute aggregations of the transformed data to existing data in the customer schema 164 of data warehouse instance.

In accordance with an embodiment, once any transformations are in place (as defined by the data model), the data pipeline or process can read the source data, apply the transformation, and then push the data to the data warehouse instance.

Data transformations can be expressed in rules, and once the transformations take place, values can be held intermediately at the staging area, where the data quality component and data projection components can verify and check the integrity of the transformed data, prior to the data being uploaded to the customer schema at the data warehouse instance. Monitoring can be provided as the extract, transform, load process runs, for example, at a number of compute instances or virtual machines. Dependencies can also be maintained during the extract, transform, load process, and the data pipeline or process can attend to such ordering decisions.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Horizontally and vertically integrated business software applications are generally directed to capturing of data in real time. This is a result of horizontally and vertically integrated business software applications being generally used for daily workflow, and storing data in a transactional database, which means that only the most current data is generally stored in such databases.

For example, while a HCM application might update a record associated with an employee when the employee transfers offices, such HCM application would generally not maintain a record of each office that the employee had worked in during their tenure with a company. As such, a BI-related query seeking to determine employee mobility within a company would not have adequate records within the transaction database to complete such a query.

In accordance with an embodiment, by storing historical, in addition to current data, generated by the horizontally and vertically integrated business software applications, in a context that is readily understandable by BI applications, the data warehouse instance as populated using the above technique provides a resource for BI applications to process such queries, using an interface provided, for example, by a business productivity and analytics product suite, or by a SQL tool of the customer's choice.

Data Pipeline Process

Figure 2:
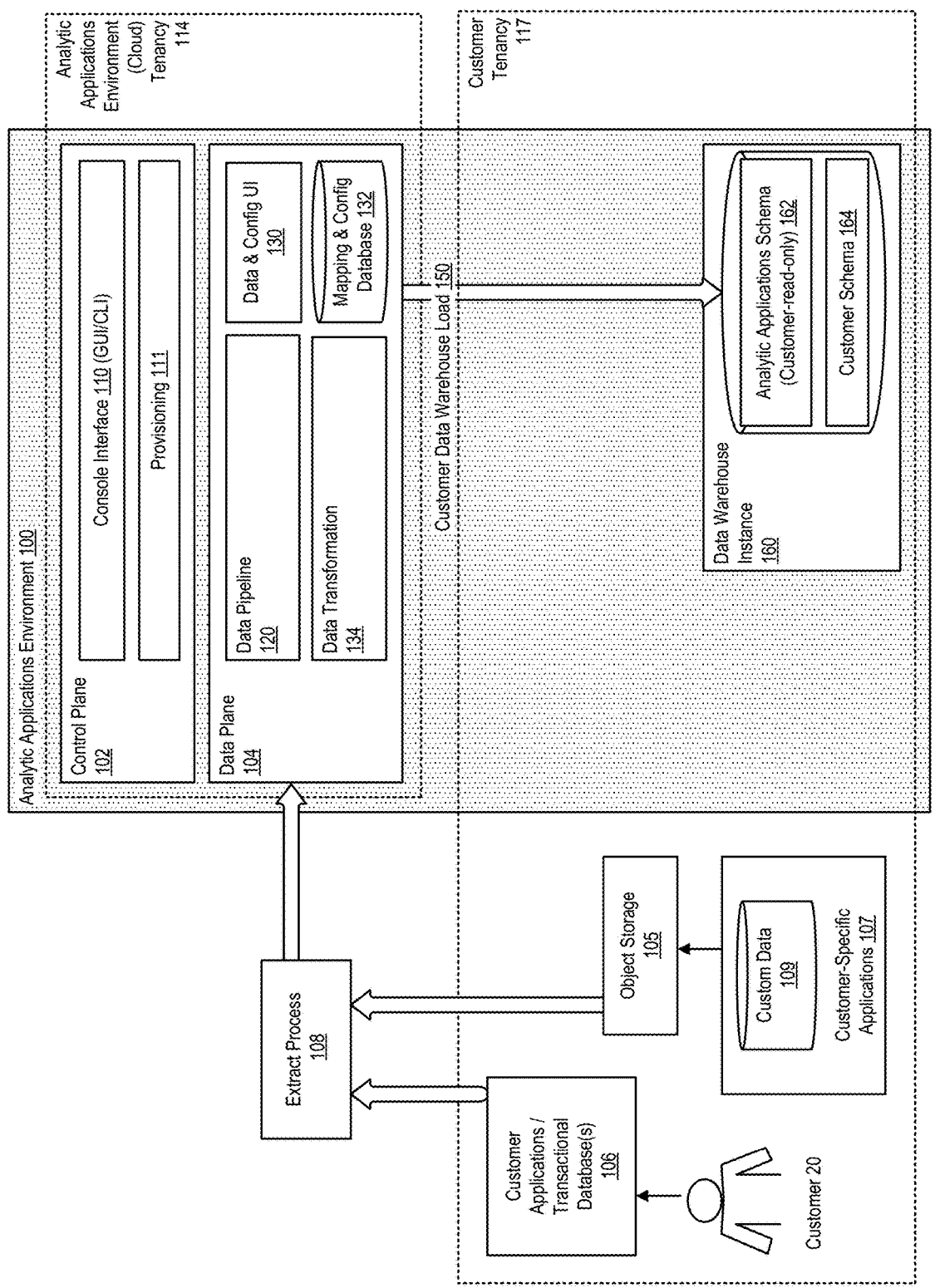
FIG. 2 further illustrates a system for providing an analytic applications environment, in accordance with an embodiment.

FIG. 2 further illustrates a system for providing an analytic applications environment, in accordance with an embodiment.

As illustrated in FIG. 2, in accordance with an embodiment, data can be sourced, e.g., from a customer's (tenant's) enterprise software application or data environment (106), using the data pipeline process as described above; or as custom data 109 sourced from one or more customer-specific applications 107; and loaded to a data warehouse instance, including in some examples the use of an object storage 105 for storage of the data.

In accordance with an embodiment, the data pipeline or process maintains, for each customer (tenant), an analytic applications schema, e.g., as a star schema, that is updated on a periodic or other basis, by the system in accordance with best practices for a particular analytics use case, e.g., human capital management (HCM) analytics, or enterprise resource planning (ERP) analytics.

In accordance with an embodiment, for each customer (tenant), the system uses the analytic applications schema that is maintained and updated by the system, within an analytic applications environment (cloud) tenancy 114, to pre-populate a data warehouse instance for the customer, based on an analysis of the data within that customer's enterprise applications environment, and within a customer tenancy 117. As such, the analytic applications schema maintained by the system enables data to be retrieved, by the data pipeline or process, from the customer's environment, and loaded to the customer's data warehouse instance in a "live" manner.

In accordance with an embodiment, the analytic applications environment also provides, for each customer of the environment, a customer schema that is readily modifiable by the customer, and which allows the customer to supplement and utilize the data within their own data warehouse instance. For each customer of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases, e.g., HCM analytics, or ERP analytics For example, in accordance with an embodiment, a data warehouse (e.g., an Oracle Autonomous Data Warehouse, ADWC) can include an analytic applications schema and, for each customer/tenant, a customer schema sourced from their enterprise software application or data environment. The data provisioned in a data warehouse tenancy (e.g., an ADWC tenancy) is accessible only to that tenant; while at the same time allowing access to various, e.g., ETL-related or other features of the shared analytic applications environment.

In accordance with an embodiment, to support multiple customers/tenants, the system enables the use of multiple data warehouse instances; wherein for example, a first customer tenancy can comprise a first database instance, a first staging area, and a first data warehouse instance; and a second customer tenancy can comprise a second database instance, a second staging area, and a second data warehouse instance.

For a particular customer/tenant, upon extraction of their data, the data pipeline or process can insert the extracted data into a data staging area for the tenant, which can act as a temporary staging area for the extracted data. A data quality component and data protection component can be used to ensure the integrity of the extracted data; for example by performing validations on the extracted data while the data is temporarily held in the data staging area. When the extract process has completed its extraction, the data transformation layer can be used to begin the transformation process, to transform the extracted data into a model format to be loaded into the customer schema of the data warehouse.

Extraction, Transformation, Load/Publish

Figure 3:
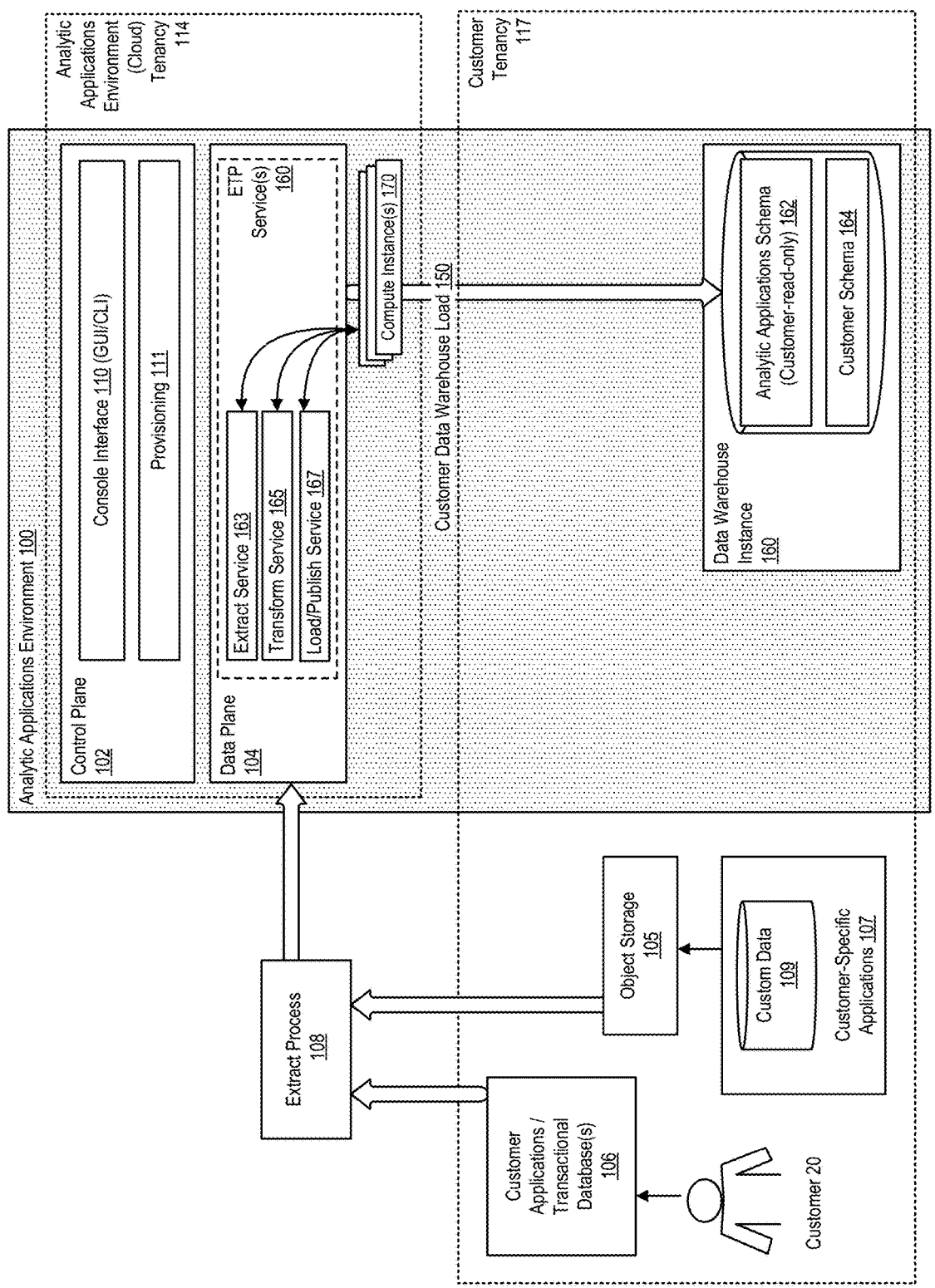
FIG. 3 further illustrates a system for providing an analytic applications environment, in accordance with an embodiment.

FIG. 3 further illustrates a system for providing an analytic applications environment, in accordance with an embodiment.

As illustrated in FIG. 3, in accordance with an embodiment, the process of extracting data, e.g., from a customer's (tenant's) enterprise software application or data environment, using the data pipeline process as described above; or as custom data sourced from one or more customer-specific applications; and loading the data to a data warehouse instance, or refreshing the data in a data warehouse, generally involves three broad stages, performed by an ETP service 160 or process, including one or more extraction service 163; transformation service 165; and load/publish service 167, executed by one or more compute instance(s) 170.

Extraction: in accordance with an embodiment, a list of view objects for extractions can be submitted, for example, to an Oracle BI cloud connector (BICC) component via a ReST call. The extracted files can be uploaded to an object storage component, for example an Oracle Storage Service (OSS) component, for storage of the data.

Transformation: In accordance with an embodiment, the transformation process takes the data files from object storage component (e.g., OSS), and applies a business logic while loading them to a target data warehouse, e.g., ADWC database, which is internal to the data pipeline or process, and is not exposed to the customer (tenant).

Load/Publish: In accordance with an embodiment, a load/publish service or process takes the data from the, e.g., IADW warehouse, and publishes it to a data warehouse instance that is accessible to the customer (tenant).

Multiple Customers (Tenants)

Figure 4:
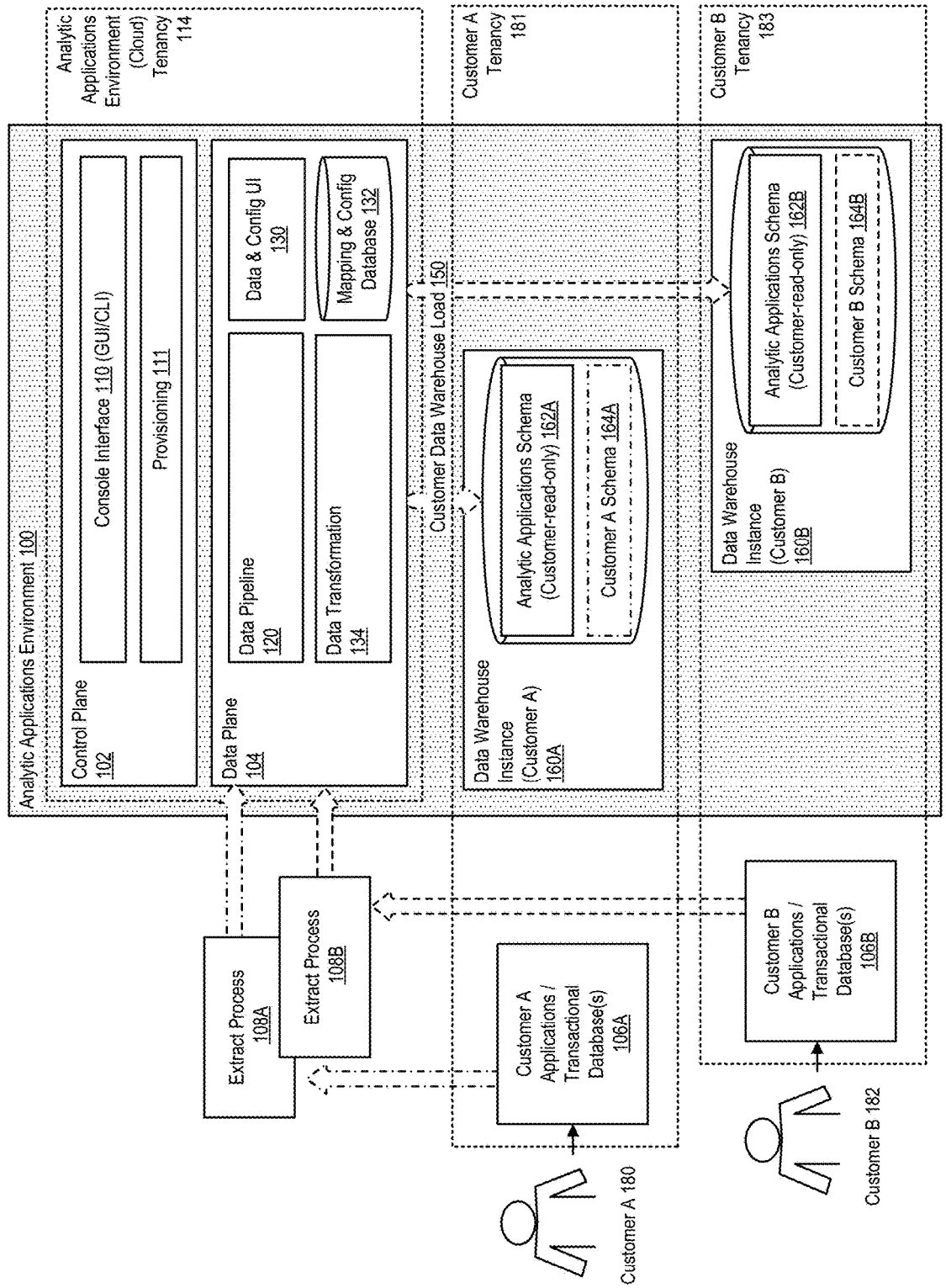
FIG. 4 further illustrates a system for providing an analytic applications environment, in accordance with an embodiment.

FIG. 4 further illustrates a system for providing an analytic applications environment, in accordance with an embodiment.

As illustrated in FIG. 4, which illustrates the operation of the system with a plurality of tenants (customers) in accordance with an embodiment, data can be sourced, e.g., from each of a plurality of customer's (tenant's) enterprise software application or data environment, using the data pipeline process as described above; and loaded to a data warehouse instance.

In accordance with an embodiment, the data pipeline or process maintains, for each of a plurality of customers (tenants), for example customer A 180, customer B 182, an analytic applications schema that is updated on a periodic or other basis, by the system in accordance with best practices for a particular analytics use case.

For each of a plurality of customers (e.g., customers A, B), the system uses the analytic applications schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the analytic applications environment also provides, for each of a plurality of customers of the environment, a customer schema 164A, 164B that is readily modifiable by the customer, and which allows the customer to supplement and utilize the data within their own data warehouse instance.

As described above, for each of a plurality of customers of the analytic applications environment, their resultant data warehouse instance operates as a database whose contents are partly-controlled by the customer; and partly-controlled by the analytic applications environment (system); including that their database appears pre-populated with appropriate data that has been retrieved from their enterprise applications environment to address various analytics use cases. When the extract process 108A, 108B for a particular customer has completed its extraction, the data transformation layer can be used to begin the transformation process, to transform the extracted data into a model format to be loaded into the customer schema of the data warehouse.

Activation Plans

Figure 5:
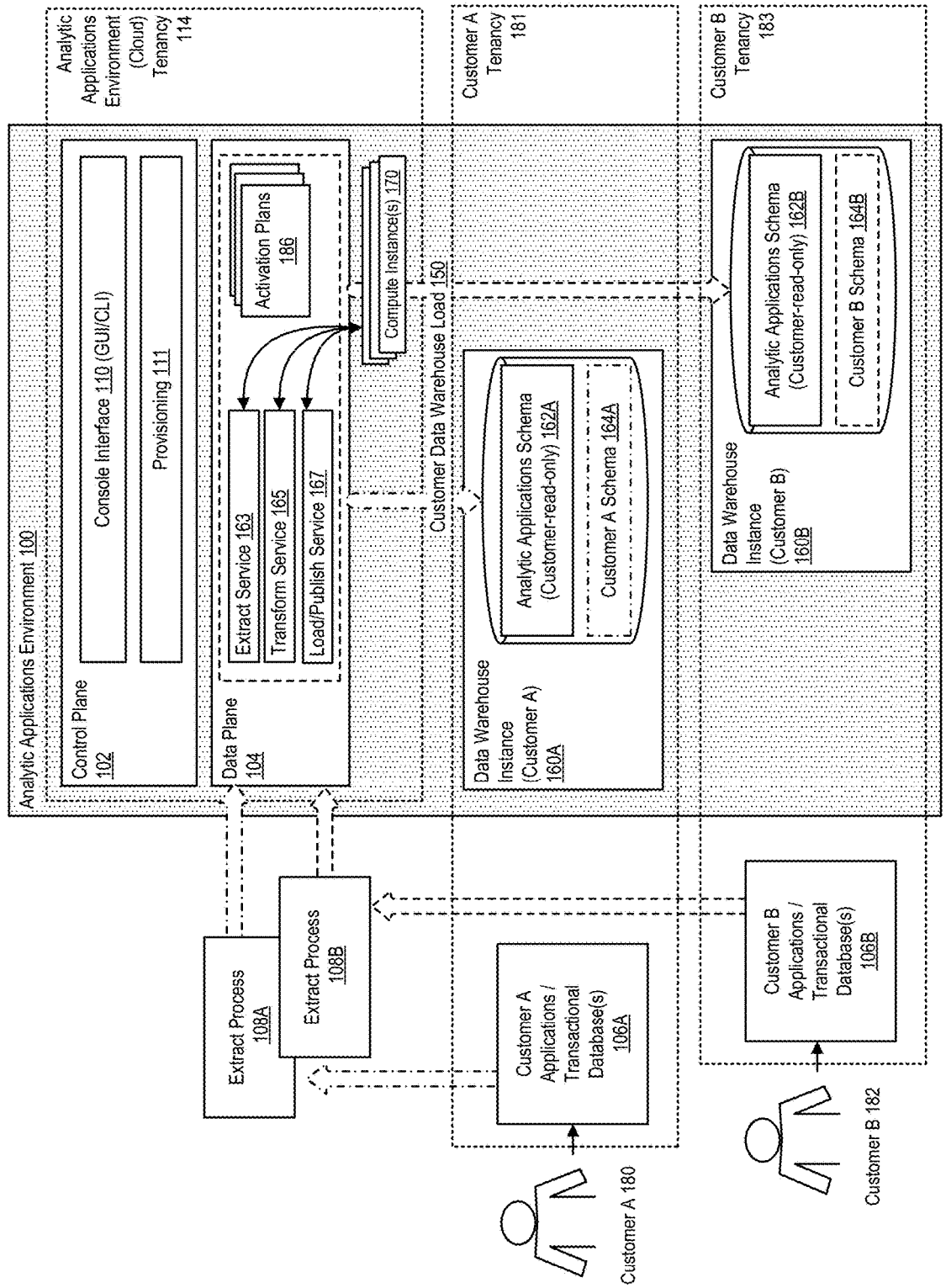
FIG. 5 further illustrates a system for providing an analytic applications environment, in accordance with an embodiment.

FIG. 5 further illustrates a system for providing an analytic applications environment, in accordance with an embodiment.

In accordance with an embodiment, activation plans 186 can be used to control the operation of the data pipeline or process services for a customer, for a particular functional area, to address that customer's (tenant's) particular needs.

For example, an activation plan can define a number of extract, transform, and load (publish) services or steps to be run in a certain order, at a certain time of day, and within a certain window of time.

Each customer can be associated with their own activation plan(s). For example, an activation plan for a first Customer A can determine the tables to be retrieved from that customer's enterprise software application environment (e.g., their Fusion Applications environment), or determine how the services and their processes are to run in a sequence; while an activation plan for a second Customer B can likewise determine the tables to be retrieved from that customer's enterprise software application environment, or determine how the services and their processes are to run in a sequence.

In accordance with an embodiment, activation plans can be stored in the mapping and configuration database and are customizable by the customer via the data and configuration UI. Each customer can have a number of activation plans. Compute instances/services (virtual machines) which execute the ETL process for various customers, according to their activation plans, can be dedicated to a particular service for the use of an activation plan, and then released for use by other services and activation plans.

In accordance with an embodiment, based on a determination of historical performance data recorded over a period of time, the system can optimize the execution of activation plans, e.g., for one or more functional areas associated with a particular tenant, or across a sequence of activation plans associated with multiple tenants, to address utilization of the VMs and service level agreements (SLAs) for those tenants. Such historical data can include statistics of load volumes and load times.

For example, the historical data can include size of extraction, count of extraction, extraction time, size of warehouse, transform time, publish (load) time, view object extract size, view object extract record count, view object extract time, warehouse table count, count of records processed for a table, warehouse table transform time, publish table count, and publish time. Such historical data can be used to estimate and plan current and future activation plans in order to organize various tasks to, such as, for example, run in sequence or in parallel to arrive at a minimum time to run an activation plan. In addition, the gathered historical data can be used to optimize across multiple activation plans for a tenant. In some embodiments, the optimization of activation plans (i.e., a particular sequence of jobs, such as ETLs) based upon historical data can be automatic.

ETL Process Flow

Figure 6:
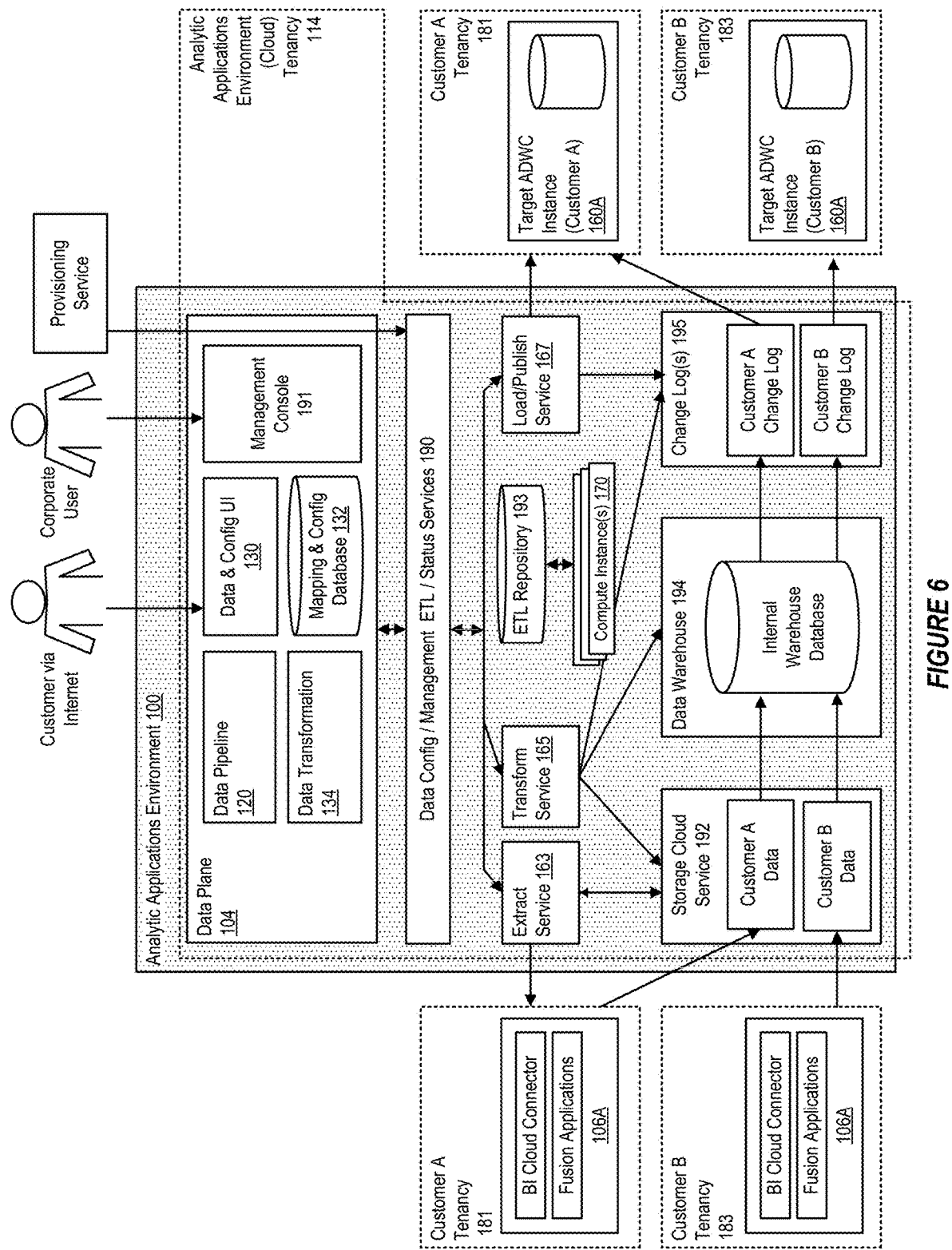
FIG. 6 further illustrates a system for providing an analytic applications environment, in accordance with an embodiment.

FIG. 6 further illustrates a system for providing an analytic applications environment, in accordance with an embodiment.

As illustrated in FIG. 6, in accordance with an embodiment, the system enables a flow of data, controlled by a data config/management/ETL/status services 190 within an (e.g., Oracle) managed tenancy, from each customer's enterprise software application environment (e.g., their Fusion Applications environment), including in this example, a BICC component, via a storage cloud service 192, e.g., OSS, and from there to a data warehouse instance.

As described above, in accordance with an embodiment, the flow of data can be managed by one or more services, including for example, an extract service, and a transform service as described above, and with reference to an ETL repository 193, that takes the data from the storage cloud service, and loads the data into an internal target data warehouse (e.g., IADW) 194, which is internal to the data pipeline or process and is not exposed to the customer.

In accordance with an embodiment, data is moved in stages into the data warehouse, and thereafter into database table change logs 195, from where the load/publish service can load the customer data into a target data warehouse instance associated with and accessible by the customer, within its customer tenancy.

ETL Stages

Figure 7:
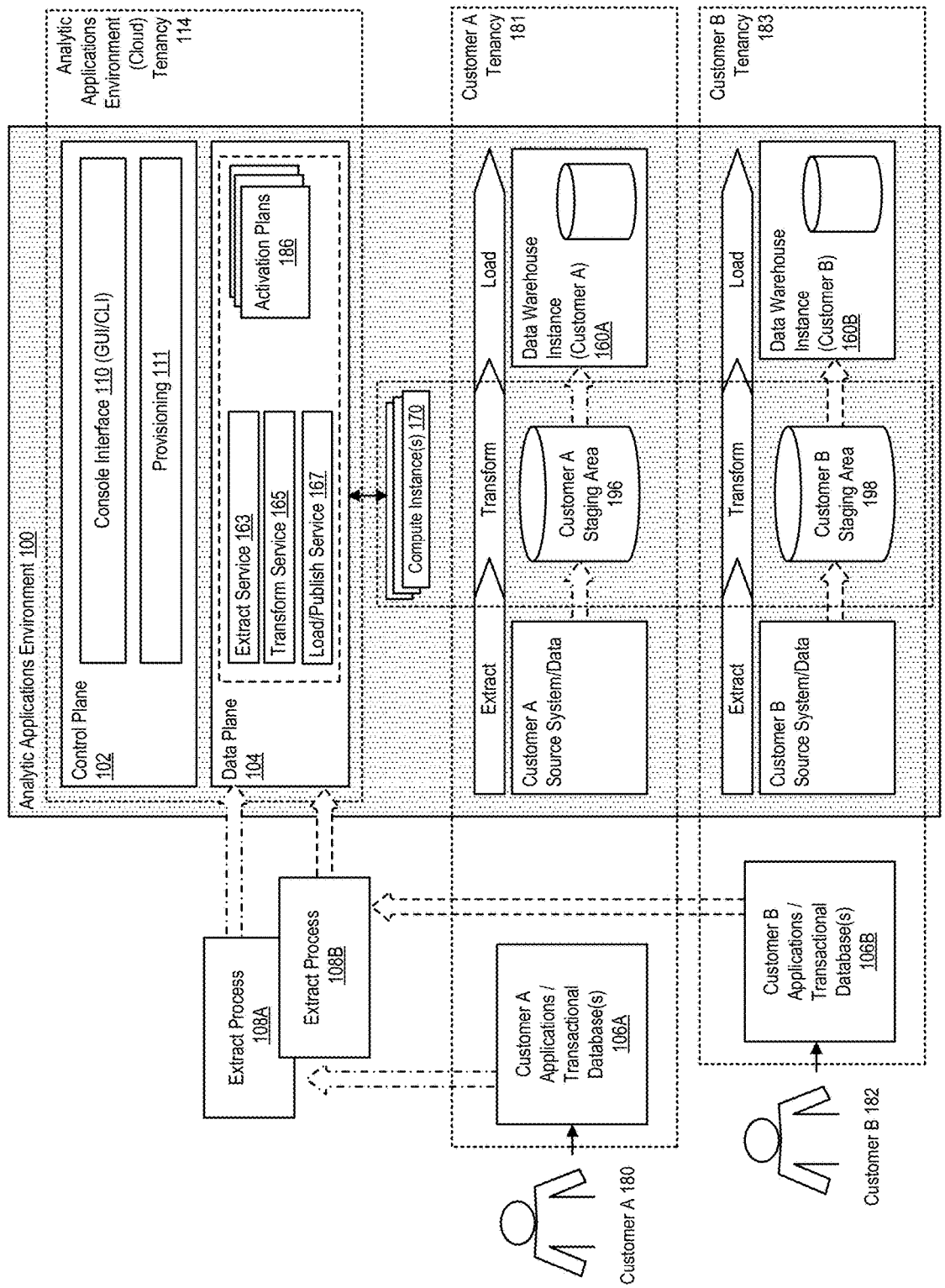
FIG. 7 further illustrates a system for providing an analytic applications environment, in accordance with an embodiment.

FIG. 7 further illustrates a system for providing an analytic applications environment, in accordance with an embodiment.

In accordance with an embodiment, the extracting, transforming and loading data from enterprise applications to a data warehouse instance involves multiple stages, and each stage can have several sequential or parallel jobs; and run on different spaces/hardware, including different staging areas 196, 198 for each customer.

Analytic Applications Environment Metrics

Figure 8:
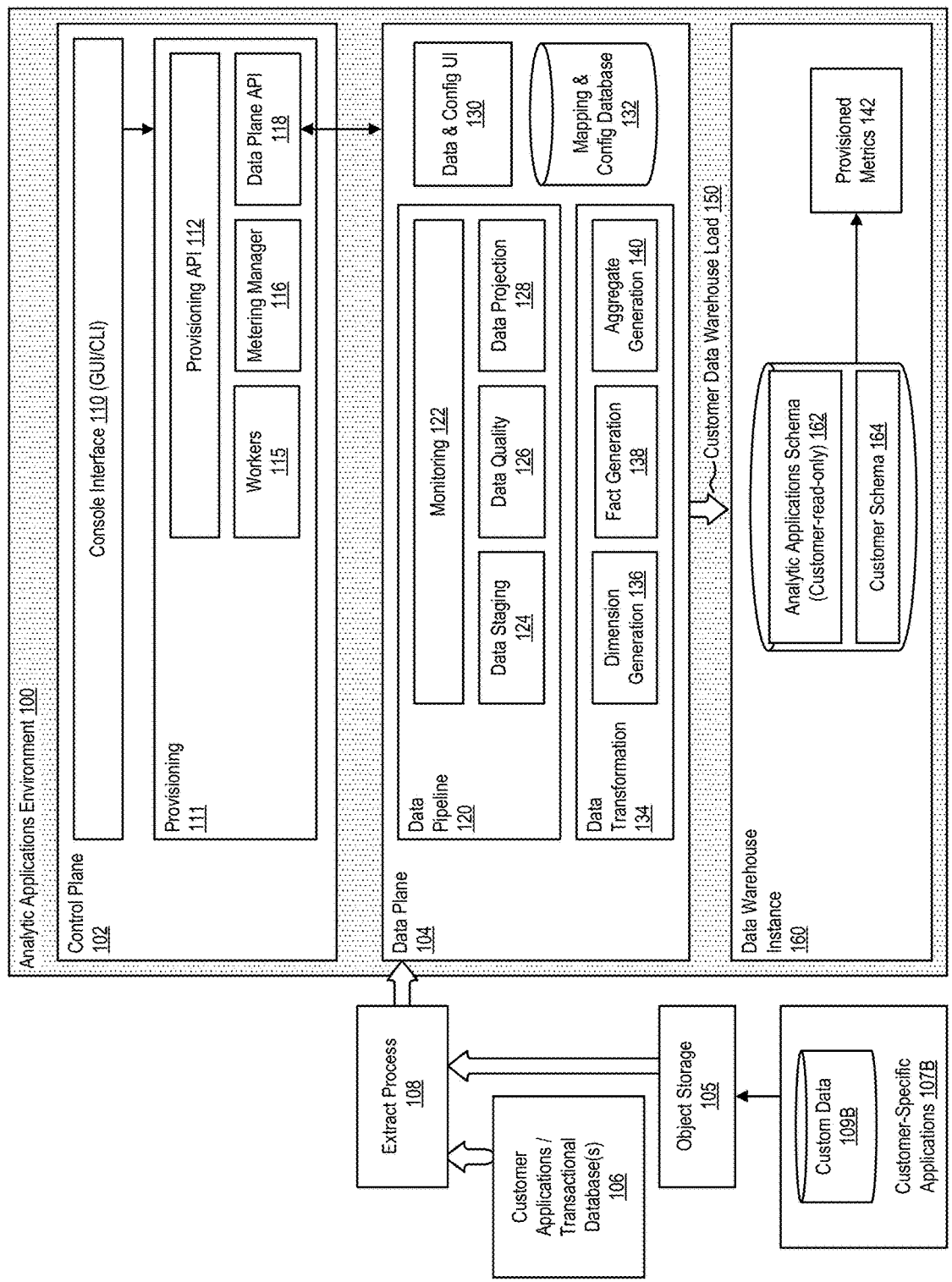
FIG. 8 further illustrates a system for providing an analytic applications environment, in accordance with an embodiment.

FIG. 8 further illustrates a system for providing an analytic applications environment, in accordance with an embodiment.

As illustrated in FIG. 8, in accordance with an embodiment, the metering manager can include functionality that meters services and usage of services provisioned through the control plane, and provide provisioned metrics 142.

For example, the metering manager can record a usage over time of processors provisioned via the control plane, for particular customers, for billing purposes. Likewise, the metering manager can record an amount of storage space of data warehouse partitioned for use by a customer of the SaaS environment, for billing purposes.

Analytic Applications Environment Customization

Figure 9:
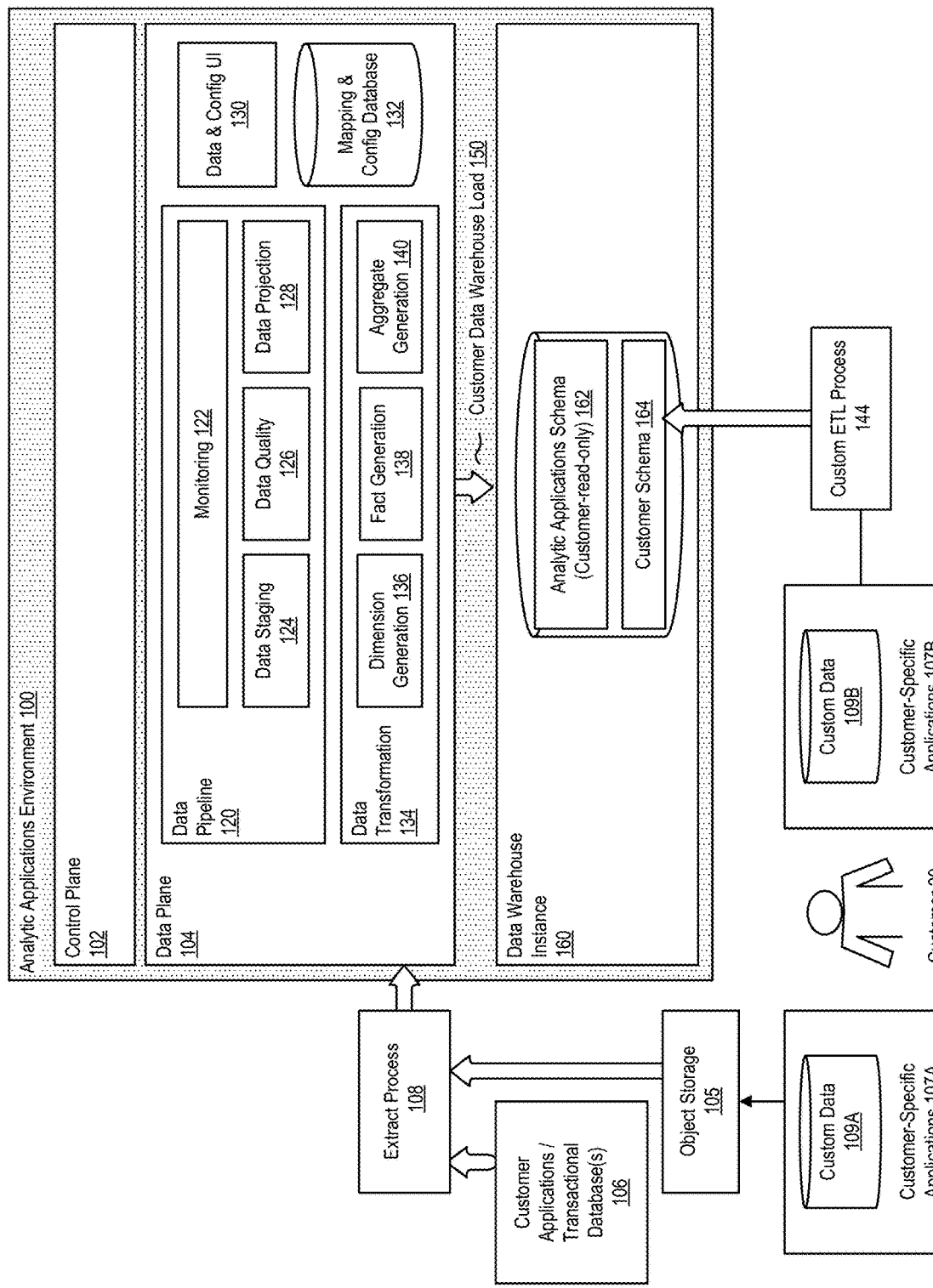
FIG. 9 further illustrates a system for providing an analytic applications environment, in accordance with an embodiment.

FIG. 9 further illustrates a system for providing an analytic applications environment, in accordance with an embodiment.

As illustrated in FIG. 9, in accordance with an embodiment, in addition to data that can be sourced, e.g., from a customer's enterprise software application or data environment, using the data pipeline process as described above; one or more additional custom data 109A, 109B, that is sourced from one or more customer-specific applications 107A, 107B, can also be extracted, transformed, and loaded to a data warehouse instance, using either: the data pipeline process as described above, including in some examples the use of an object storage for storage of the data; and/or a custom ETL or other process 144 that is mutable from the customer's perspective. Once data has been loaded into their data warehouse instance, customers can create business database views that combine tables from both their customer schema and the software analytic application schema; and can query their data warehouse instance using an interface provided, for example, by a business productivity and analytics product suite, or by a SQL tool of the customer's choice.

Analytic Applications Environment Method

Figure 10:
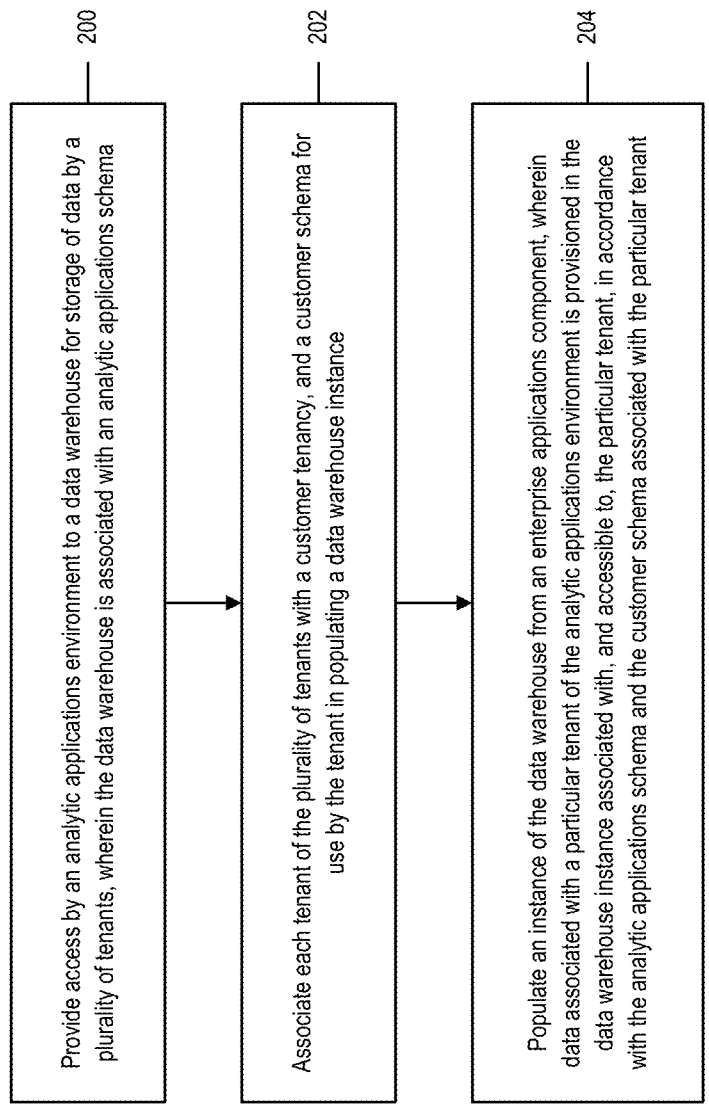
FIG. 10 illustrates a flowchart of a method for providing an analytic applications environment, in accordance with an embodiment.

FIG. 10 illustrates a flowchart of a method for providing an analytic applications environment, in accordance with an embodiment.

As illustrated in FIG. 10, in accordance with an embodiment, at step 200, an analytic applications environment provides access to a data warehouse for storage of data by a plurality of tenants, wherein the data warehouse is associated with an analytic applications schema.

At step 202, each tenant of the plurality of tenants is associated with a customer tenancy, and a customer schema for use by the tenant in populating a data warehouse instance.

At step 204, an instance of the data warehouse is populated with data received from an enterprise software application or data environment, wherein data associated with a particular tenant of the analytic applications environment is provisioned in the data warehouse instance associated with, and accessible to, the particular tenant, in accordance with the analytic applications schema and the customer schema associated with the particular tenant.

Automatic Generation of ETL Asserts

During the loading of data, from one or more data sources, to a data warehouse or other database, there may be a need to prepare the data in some manner; for example by extracting the data from a highly-normalized transactional system data source, and transforming the data into one or more data warehouse or database schemas that support analytic querying and business intelligence processes.

For example, an Extract, Transform, and Load (ETL) process can be used to extract data from a source database, pass the data through a middle-tier transformation server, and then transform the data into a schema suitable for use in a data warehouse. During such process, data that may need to be looked-up from the target database can be cached on a local server. Once the data is transformed locally, it can be loaded into the target database.

However, ETL processes can be complex and prone to errors; and failures may result, for example, due to erroneous configuration; erroneous data mapping across different formats, such as, for example from a tab-separated values (TSV) format to a comma-separated values (CSV) format; or corruption of intermediate files. Such factors can affect the quality of the data being converted and loaded into a data warehouse, and ultimately lead to inaccurate business intelligence information. In some environments, asserts can be used to help verify ETL data during the ETL process. However, asserts are challenging to implement in the verification of ETL processes, since it is generally not possible to program all assertions for an ETL process in an a-priori manner.

In accordance with an embodiment, described herein are systems and methods for use with an analytic applications environment, for automatic generation of asserts in such environments. A data pipeline or process, such as, for example an extract, transform, load (ETL) process, can operate in accordance with an analytic applications schema adapted to address particular analytics use cases or best practices, to receive data from a customer's (tenant's) enterprise software application or data environment, for loading into a data warehouse instance. Each customer (tenant) can additionally be associated with a customer tenancy and a customer schema. During the process of populating a data warehouse instance, the system can automatically generate dynamic data-driven ETL asserts, including determining a list of columns for tables in the data warehouse; determining a data type for each column; generating an assert for each determined data type; validating the generated assert; and maintaining the generated assert.

Assertions (Asserts)

In computer programming, an assertion (assert) can comprise a statement that a predicate, such as, for example, a Boolean-valued function, or a true-false expression, is always true at a given point in code execution and evaluation.

For example, an assert can be used in the context of manipulating a data field that represents the age of a person. Such an assert could be coded as, for example:

ASSERT (age>0 and age<130).

If, at the given point in code execution, an assert evaluates to false, then a corresponding assertion exception can be thrown, and the assertion exception then handled appropriately.

However, when applied to the task of verifying ETL data during an ETL process, asserts can be challenging to implement, since it is generally not possible to program all assertions for a particular ETL process in an a-priori manner, for a number of reasons.

First, the ETL process is generally not aware of the range of data that is valid for a given data type. This problem is further complicated in a SaaS environment, since such validity of data types can vary from one customer to another. For example, in a financial application environment, as might be used for expense and budgeting purposes, an airfare of $10,000 may be a valid amount for an organization that allows first-class travel for its employees, but may be an invalid amount for an organization that does not allow such first-class travel. Additionally, the range of valid values for air travel expenses, for either organization, may change over time.

Additionally, data values may also be invalid within particular data (e.g., time, location) intervals. For example, in a financial application environment, a value for taxi fare expenses may be less than $100 within a particular city, but may be greater than $200 in a larger, nearby city. Such a situation would render a range of $100-$200 for expected taxi fare as invalid.

Further complicating the issue, the severity of data errors can vary across customers, and across data columns with otherwise similar sets of data—unlike in a typical computer program environment where an assert is generally used to detect a condition that is impossible regardless of which customer executes the code or when it is executed.

In accordance with an embodiment, in order to effectively use asserts for data verification during an ETL process, the system evaluates dynamic data-driven asserts. Once an organization has gathered sufficient data from its applications, databases, or processes, the data itself can provide clues as to what should be considered valid data, and what should not be considered valid data. Dynamic data-driven asserts can similarly enable the system to learn over time, which data is considered valid data, and which data is considered to be not valid (invalid) data. When used with data warehouses offered in SaaS and other shared computing environments, data values can also be compared across multiple customer data warehouses, to create or improve upon the use of dynamic data-driven asserts.

In accordance with an embodiment, dynamic data-driven asserts can be generated for data columns in a database or in a warehouse. In typical enterprise environments, assertions on numeric values are of particular interest, since such enterprises often make financial decisions based on numeric values; and accordingly, errors in such numeric values are of particular consequence.

In accordance with an embodiment, the generation of dynamic data-driven asserts can also be extended to other types of data, such as, for example date values, or strings, using similar principles as described herein.

Figure 11:
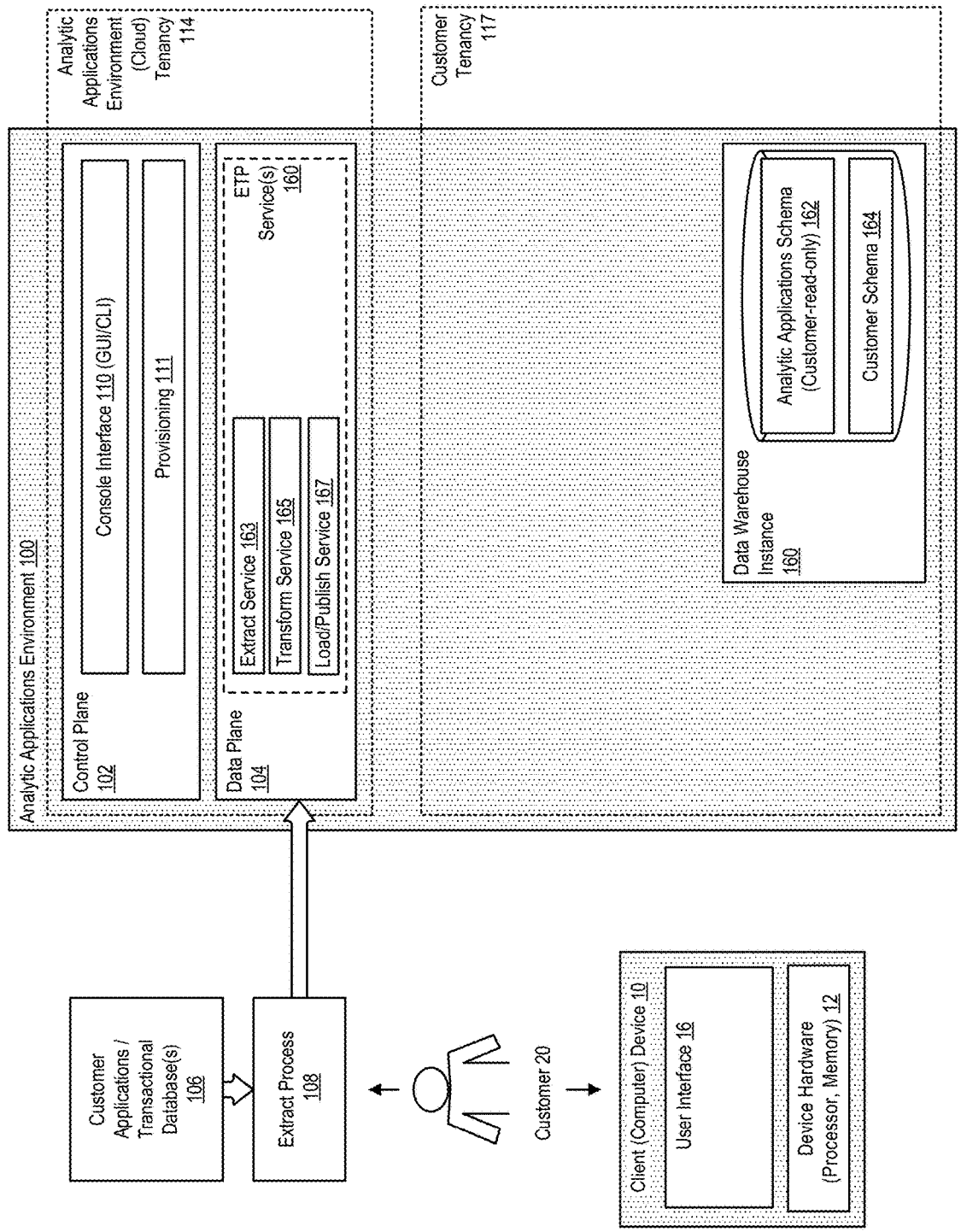
FIG. 11 illustrates a system for use with an analytic applications environment, for automatic generation of asserts, in accordance with an embodiment.

FIG. 11 illustrates a system for use with an analytic applications environment, for automatic generation of asserts, in accordance with an embodiment.

In accordance with an embodiment, the lifecycle of dynamic data-driven asserts can be generalized within three phases: the generation of asserts, the validation of asserts, and the ongoing maintenance of asserts.

As illustrated in FIG. 11, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, a data pipeline such as an ETL process, on a periodic or other basis, as described above.

Figure 12:
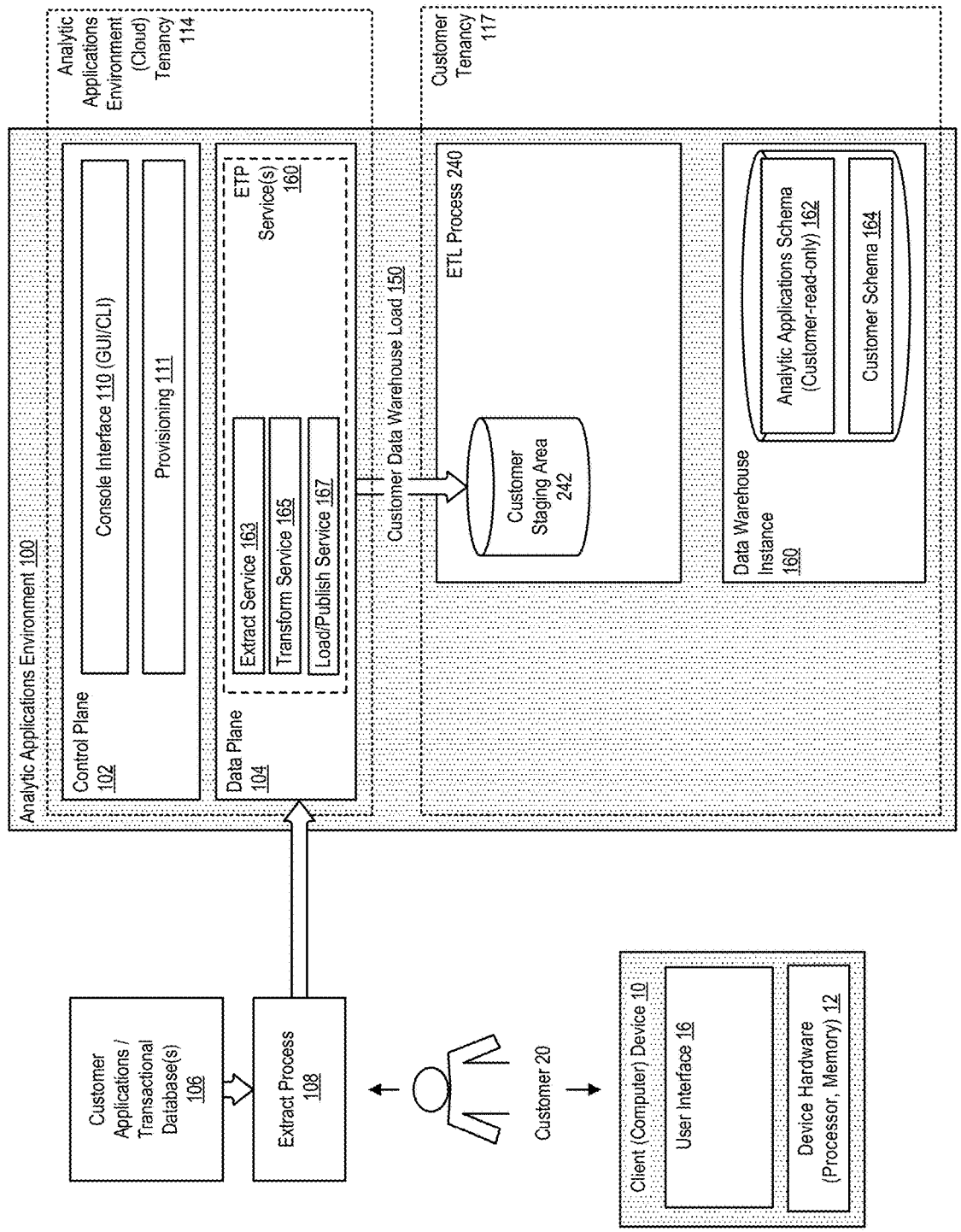
FIG. 12 further illustrates a system for use with an analytic applications environment, for automatic generation of asserts, in accordance with an embodiment.

FIG. 12 further illustrates a system for use with an analytic applications environment, for automatic generation of asserts, in accordance with an embodiment.

As illustrated in FIG. 12, in accordance with an embodiment, the data pipeline or process can be scheduled to execute at intervals (e.g., hourly/daily/weekly) to extract transactional data from an enterprise software application or data environment, such as, for example, business productivity software applications and corresponding transactional databases that are provisioned in the SaaS environment. An extract process can extract the transactional data, whereupon extraction the data pipeline or process can insert extracted data into a data staging area 242 associated with the customer, which can act as a temporary staging area for their extracted data.

Figure 13:
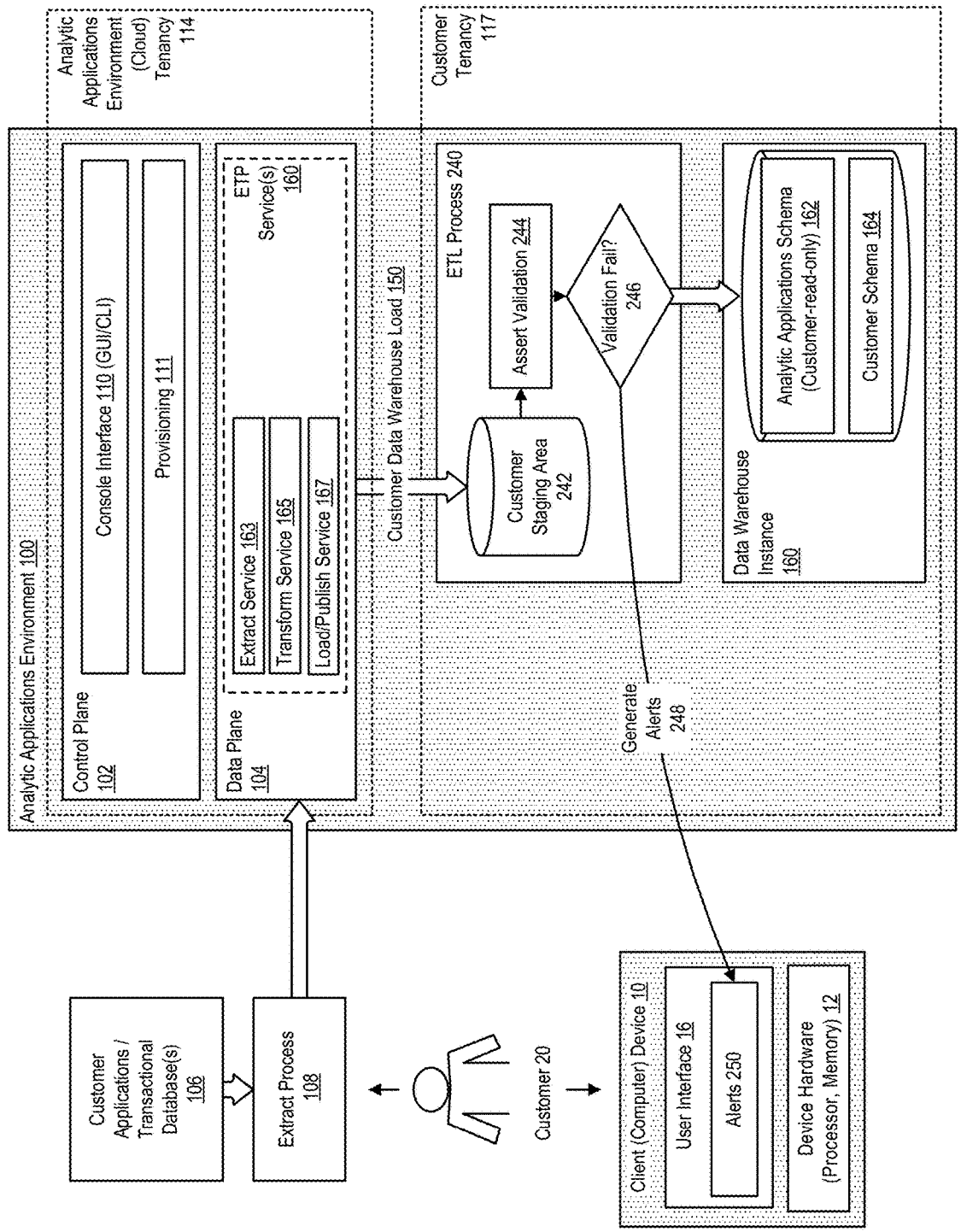
FIG. 13 further illustrates a system for use with an analytic applications environment, for automatic generation of asserts, in accordance with an embodiment.

FIG. 13 further illustrates a system for use with an analytic applications environment, for automatic generation of asserts, in accordance with an embodiment.

As illustrated in FIG. 13, in accordance with an embodiment, during the generation of assert and validation of assert phases, and following the transformation provided by the ETL process, the system can perform assert validation 244, according to one or more dynamic data-driven asserts generated for different data types.

In accordance with an embodiment, if the data is validated by the dynamic data-driven asserts, then the data can be loaded into the appropriate customer schema of the data warehouse. If, instead any of the data is not validated by the dynamic data-driven asserts, or the validation otherwise fails (246), then an appropriate alert is generated 248, and sent as an alert 250, for example to an administrator's computer system.

In accordance with an embodiment, various examples of dynamic data-driven asserts for integer values can include:

Unique value asserts, for example wherein a column holds only a single value, such as a legal entity value, or the update ID for the process that updated the warehouse;

Strictly sequential asserts, for example to verify a SOURCE_RECORD_ID column, where the next identifier (ID) always equals the previous ID incremented by 1;

Strictly cyclic asserts, for example, for verifying a column for holding the day of a yearly quarter, which should cycle from 1-90 and then start back at 1;

Non-negative asserts, for example an assertion verifying that data values in a column are positive); and Value set (ValueSet) asserts, for example an assertion verifying that data values are contained within a set of values).

The above examples of dynamic data-driven asserts are provided by way of example, to illustrate various types of dynamic data-driven asserts. In accordance with various embodiments other types of asserts can be supported.

In accordance with an embodiment, for columns of data holding real value data, a dynamic data-driven assert verifying the probability of a data value exceeding a threshold can be generated.

In accordance with an embodiment, for a given data file (e.g., a given customer file) in a data warehouse), the set of values (i.e., a value set) for the data columns in the data file is generated. For each column in the value set, the system can determine if the values in the column are unique, strictly sequential, cyclic or non-negative (as described above). If the values for any column are indeed determined to be unique, strictly sequential, cyclic or non-negative, then the system can generate the appropriate assert, as described above.

In accordance with an embodiment, if instead, for any of the columns of data in the value set, it is determined that the values are not one of unique, strictly sequential, cyclic or non-negative, then a value set assert can be created. For example, the value set asset can include a rule asserting that the column values should be one of the values included in the value set of the column. The correctness of the rule is checked by determining whether the data column has the same value set across tables, for example across tables of other data files stored at the data warehouse. If the data column does not have the same value set across tables, then the corresponding rule is improved to incorporate the values of the other columns that are outside the data set, thereby forming an improved data set.

Figure 14:
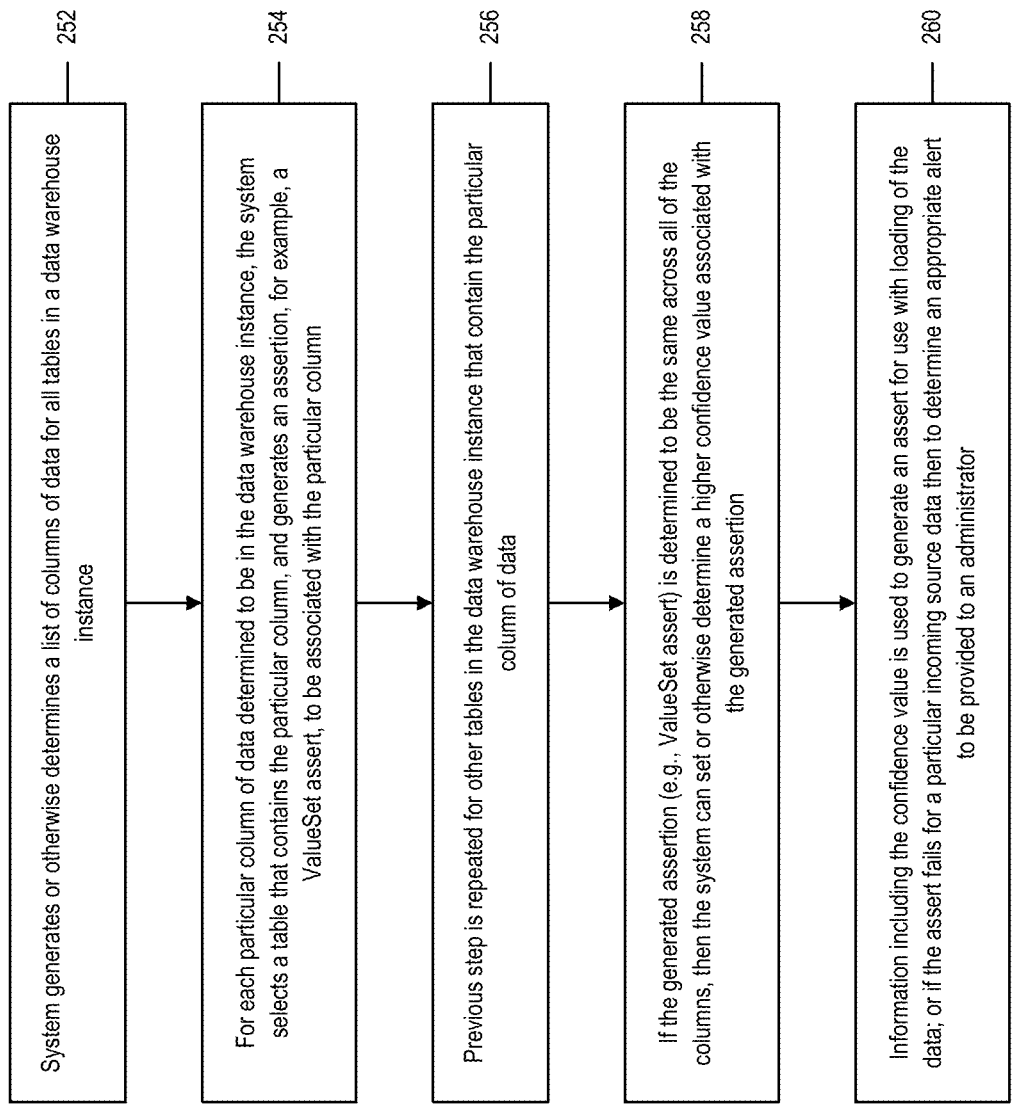
FIG. 14 illustrates a flowchart of a method for generation of dynamic data-driven asserts, in accordance with an embodiment.

FIG. 14 illustrates a flowchart of a method for generation of dynamic data-driven asserts, in accordance with an embodiment.

As illustrated in FIG. 14, in accordance with an embodiment, at step 252, the system generates or otherwise determines a list of columns of data for all tables in a data warehouse instance.

At step 254, for each particular column of data determined to be in the data warehouse instance, the system selects a table that contains the particular column, and generates an assertion, for example, a ValueSet assert, to be associated with the particular column.

At step 256, the previous step is repeated for other tables in the data warehouse instance that contain the particular column of data.

At step 258, if the generated assertion (e.g., ValueSet assert) is determined to be the same across all of the columns, then the system can set or otherwise determine a higher confidence value associated with the generated assertion.

At step 260, the information including the confidence value is used to generate an assert for use with loading of the data; or if the assert fails for a particular incoming source data then to determine an appropriate alert to be provided to an administrator. The process can then be continued on an ongoing basis, to evaluate and adjust if appropriate the confidence values associated with the data, as tables and columns of data continue to be processed.

In accordance with an embodiment, Listing 1 illustrates an example algorithm for the generation of dynamic data-driven asserts for integer values. In accordance with other embodiments, other types of algorithms can be used.

---

Listing 1

---

```
Generate_ValueSet_Asserts( )
{
Generate a list of columns for all tables in the warehouse;
UnProcessed = {<all_table_columns>}
For each column in head(Unprocessed) do
{
UnProcessed = UnProcessed.remove(column)
Select a table which contains the column and generate the value set for
the column;
Other_table_count = 0;
For all other tables that contain the column do
{
Other_table_count = Other_tabl_count+1;
If (valueset is the same), set confidence = confidence+1;
Else set valueset = valueset U (table_Valueset);
}
Generate Assert (column_name in Value_Set);
Set confidence = confidence/Other_table_count;
}
}
```

---

Figure 15:
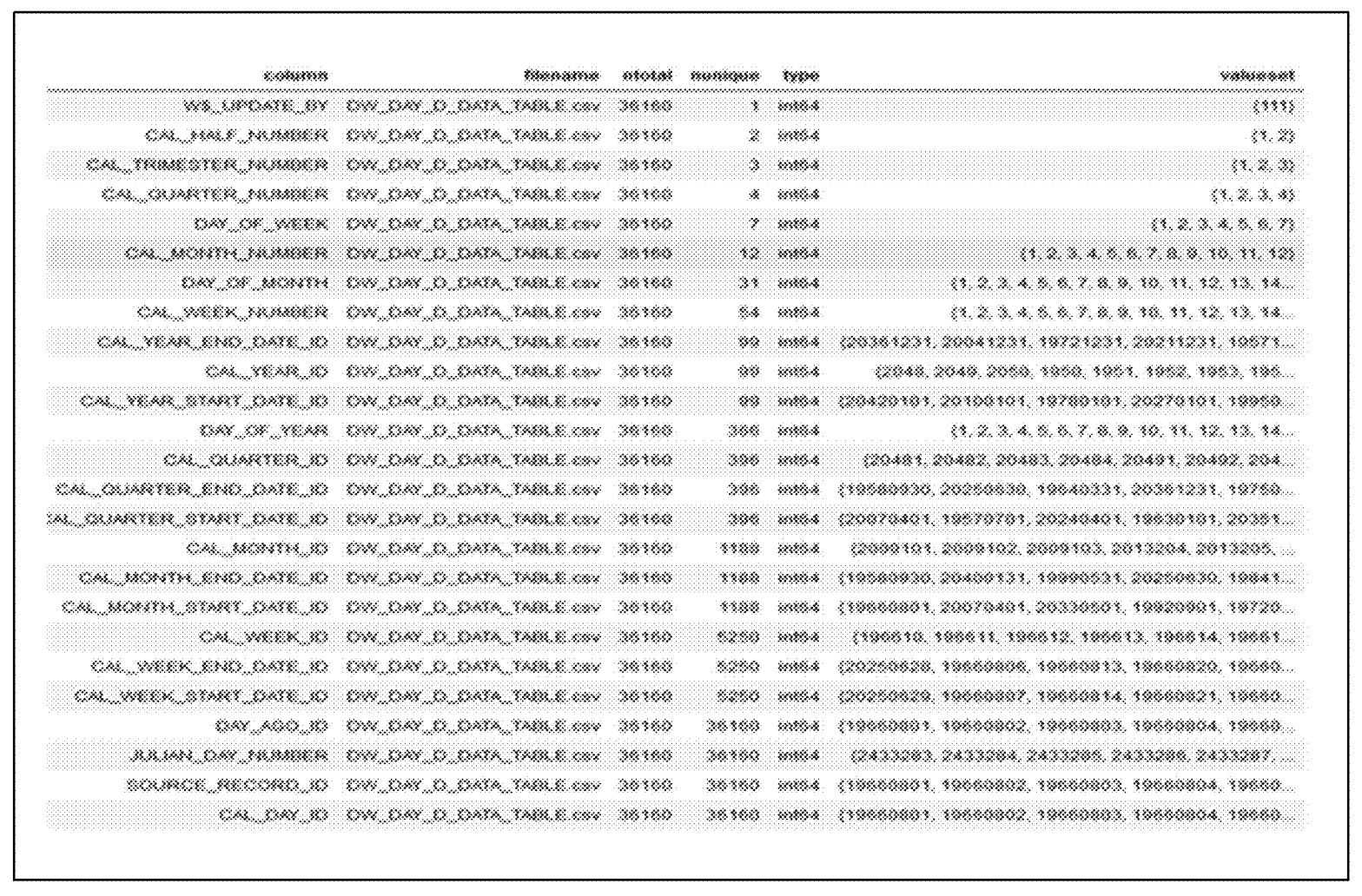

FIG. 15 illustrates an example of various column data with value sets for a warehouse file, in accordance with an embodiment.

As illustrated in FIG. 15, in accordance with an embodiment and the example illustrated therein, the figure illustrates a particular customer data as may be stored in a data warehouse service offered in a SaaS environment. In the illustrated example, the value of "ntotal" is the total number of rows in the column, and the value of "nunique" is the number of unique values in the column. The value set displays the unique values in each column.

In accordance with this example, from this table, the system can infer that the column W$_UPDATE has a single value, and that the assert for this column should be, for example:

ASSERT (W$_UPDATE==111}).

Similarly, asserts can be generated for the columns JULIAN_DAY_NUMBER, SOURCE_RECORD_ID and CAL_DAY_ID as, for example:

ASSERT (Strictly_Sequential (JULIAN_DAY_NUMBER)).

Figure 16:
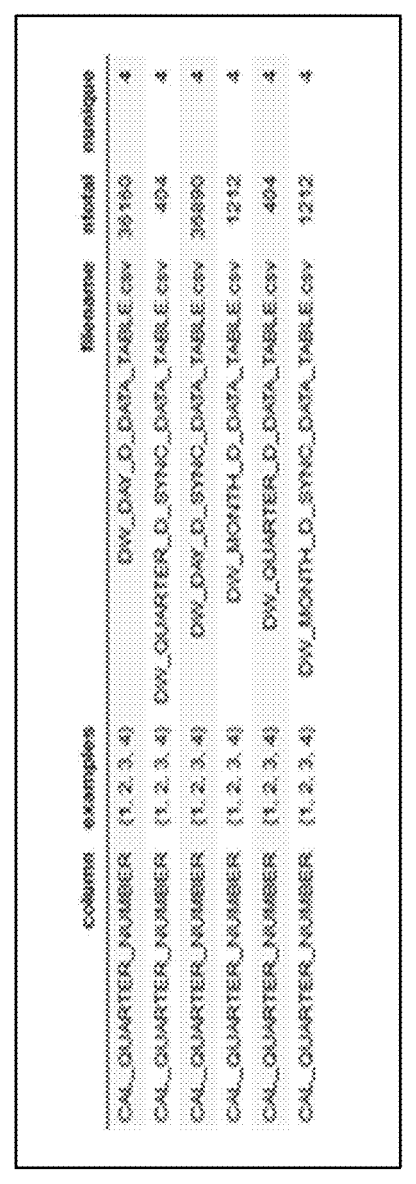

FIG. 16 illustrates another example of various column data with value sets for a warehouse file, in accordance with an embodiment.

As illustrated in FIG. 16, in accordance with an embodiment and the example illustrated therein, if the rule Assert (CAL_QUARTER_NUMBER in {1, 2, 3, 4}) is generated from the data illustrated in FIG. 15, then the column value sets for all the files containing this column can be extracted, and the confidence in this assert can be updated.

For example, if the value set for the column CAL_QUARTER_NUMBER is the same for six additional tables having this column in the data warehouse, then in this example the assert generated will be Assert (CAL_QUARTER_NUMBER in {1, 2, 3, 4}) and the confidence will be Confidence=6/6=1, where 1 is the highest confidence that can be achieved.

In accordance with an embodiment, after all asserts are generated, the asserts can be labeled as mutable (i.e., values can change over time) or immutable (i.e., values are fixed permanently).

For example, in accordance with an embodiment and the example illustrated above, an Assert (CAL_QUARTER_NUMBER in {1, 2, 3, 4}) will be marked immutable, since the number of quarters in a calendar year will never change.

In accordance with an embodiment, the labeling can be performed by the system either by comparing the values across customer files within the data warehouse, or in some instances by requesting a human evaluator to review and label the assert.

Generation and Validation of Asserts for Real Valued Data

In accordance with an embodiment, asserts for real valued column types can be provided by the system in the form of probabilities, since real valued numbers form an infinite set. Probabilistic assertions can be provided as Boolean expressions that express the probability that a property will be true in a given execution, rather than asserting that the property must always be true. For example, in accordance with an embodiment the asserts can take the form:

ASSERT (probability (col_value==X))>Threshold

Figure 17:
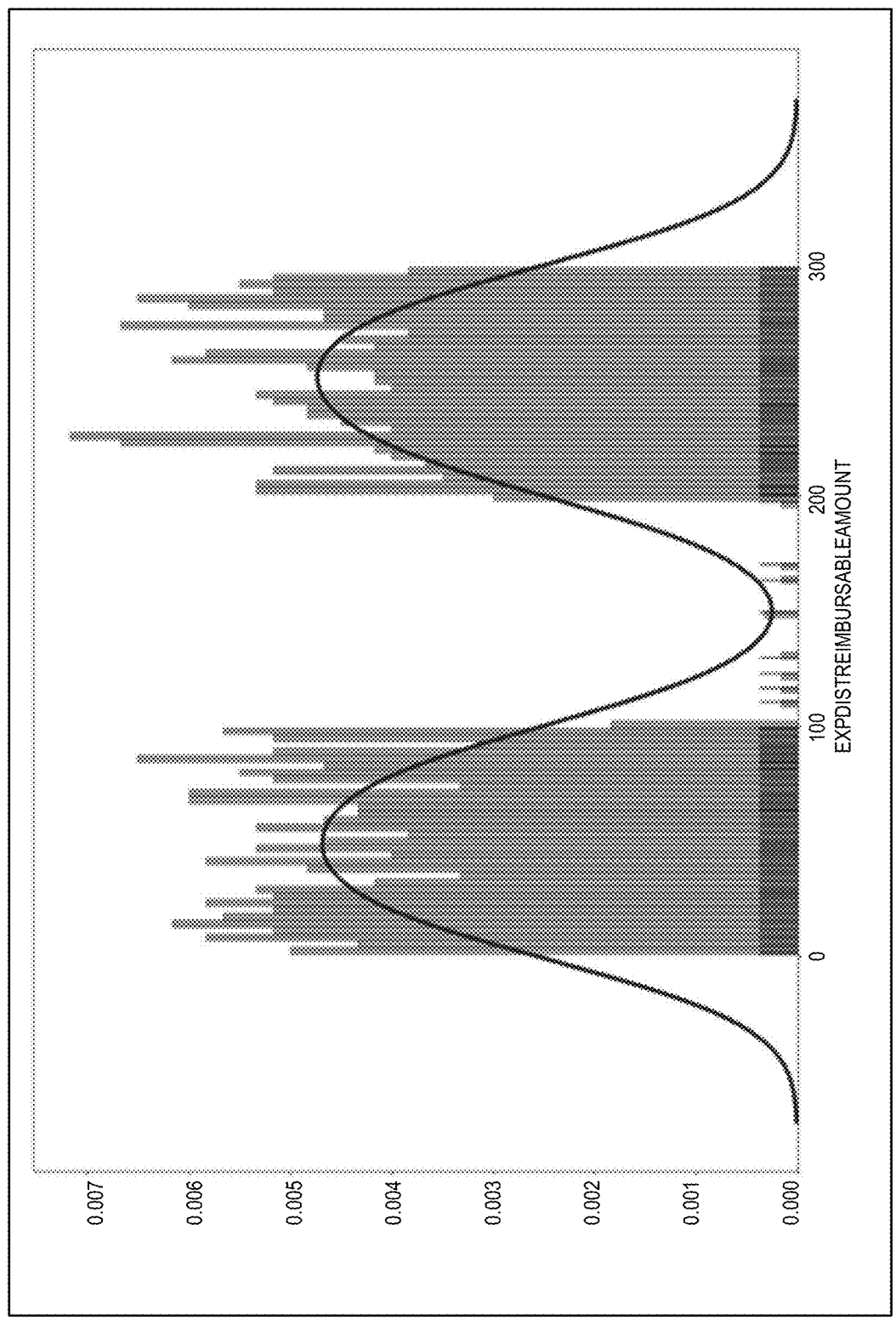
FIG. 17 illustrates an example distribution plot associated with various column data, in accordance with an embodiment.

FIG. 17 illustrates an example distribution plot associated with various column data, in accordance with an embodiment.

As illustrated in FIG. 17, in accordance with an embodiment and the example illustrated therein, a distribution plot of values is shown for an example financial application environment including taxi reimbursement. In the illustrated example, the distribution includes one thousand values between 0 and 100, and another thousand values between 200 and 300. There are ten values between 100 and 200.

Accordingly, in the illustrated example, the probability of a data value in the ranges {0, 100} and {200, 300} is relatively high; while the probability value in the range (100, 200) is relatively low; and the probability of data value greater than 300 or less than 0 is zero.

In accordance with an embodiment, the system can be adapted to perform a Kernel Density Estimation (KDE) or other type of calculation to model or calculate such probabilities. Following the modeling, new values in a column (e.g., following a daily ETL process) can be scored, and asserts can be generated for checking that the probability of the data point is above a pre-defined threshold.

In accordance with an embodiment and the example distribution plot illustrated above, if values of 250, 50, 150, 175, 1000, 300, and 105 were contained in a column that recorded taxi fares, then the probabilities generated by a KDE model or calculation would be $1.58601321e{-}002$, $2.18076041e{-}002$, $3.96499609e{-}003$, $2.74357216e{-}090$, $0.00000000e{+}000$, $9.91258627e{-}003$, and $4.18388615e{-}138$, respectively.

Thus, in this example, for a threshold value of $1 \times 10^{\wedge}{-}4$, the values 175, 1000, and 105 would make the assert fail, thereby indicating that these values are highly improbable (as taxi fares).

In accordance with an embodiment, asserts can be generated for each customer having a data file residing at a given data warehouse. For example, the above asserts may be represented as shown in Table 1.

TABLE 1

| Column Name | Column Type | Assert Rule | Rule Confidence | Mutable | Supporting Tables |
|---|---|---|---|---|---|
| CAL_QUARTER_NUMBER | Int64 | Assert (CAL_QUARTER_NUMBER in {1, 2, 3, 4}) | 1 (6/6) | N | Table A, B, C |
| Expense_Taxi_Fare | Float | Assert (KDE (taxi_fare)) >0.005 | 0.9 | Y | Table X, Y, Z |

In accordance with an embodiment and the example illustrated above, after the asserts have been generated, the asserts can also be translated into a suitable database query language, e.g., SQL, for execution. For example, for the column CAL_QUARTER_NUMBER in the table DW_DAY_D_DATA_TABLE, a corresponding SQL statement can be as shown, below, which should return a null data set:

SELECT CAL_QUARTER_NUMBER

FROM DW_DAY_D_DATA_TABLE

WHERE CAL_QUARTER_NUMBER NOT IN {1, 2, 3, 4}.

Testing of Asserts

In accordance with an embodiment, after the query language (e.g., SQL) for the asserts are generated, the asserts can then be tested on a live data, for a specific period of time, for example a month.

During such a testing phase, asserts that are found not to accurately reflect the data for the column which they verify can be updated, for example using human input. Sometimes an assert may fail not because of the data values, but because of errors during the ETL process, which may also require human input to address.

In accordance with an embodiment, at the end of this phase, data such as that shown in Table 2 can be generated for each assert.

TABLE 2

| Customer | Column Name | Table Name | Assert Violation Date | Column Value for Assert Violation |
|---|---|---|---|---|
| ABC | CAL_QUARTER_NUMBER | DW_DAY_D_DATA_TABLE | Jan. 1, 2019 | 5 |
| XYZ | Expense_Taxi_Fare | Employee_Expenses_Table | Jan. 1, 2019 | 300 |

In accordance with an embodiment, violations for each assert can be analyzed and the corresponding asserts can be modified.

For example, in accordance with an embodiment, each time an assert is violated, the confidence value associated with the assert might be decremented by a small amount (e.g., 0.01). If the confidence value decreases below some threshold (e.g., 0.5), then an alert to an administrator can be issued, indicating the need to analyze/modify the assert. The modified asserts can then be inserted into the list of valid asserts.

In accordance with an embodiment, Listing 2 illustrates an example algorithm for validating asserts. In accordance with other embodiments, other types of algorithms can be used.

Listing 2

```
Validate_Assert( )
{
For each assert do
{
Compute number of customers the assert got violated;
If the number is above some threshold (25% of customers);
    Modify the assert to include offending values;
    Run the asserts on the data;
    If (the number of customers in violation decrease) accept the assert;
}
}
```

In accordance with an embodiment, the asserts can be put into production when it is stable. Stability can be defined, e.g., as Count (Assert_violations)<some threshold in the evaluation period, or as some percentage of customers affected by the assert violation.

Maintenance and Updating of Asserts

In accordance with an embodiment, the data-driven asserts as described herein are dynamic in order to reflect the dynamics of enterprise data. Therefore, when an assert fails, the assert may need to be modified to reflect new data values in the case of integer asserts, and new data distributions in the case of real valued asserts. In accordance with an embodiment, this can be done in a maintenance phase, in a manner similar to the validation phase, as described above.

Additionally, in accordance with an embodiment, some asserts may need to be modified to account for seasonality effects. For example, an Assert (Prob(Hotel Fare)<$500) might have to be modified to account for peak season occupancy at various times of the calendar year.

In accordance with an embodiment, Listing 3 illustrates an example algorithm for updating asserts. In accordance with other embodiments, other types of algorithms can be used.

Listing 3

```
For each assert do
{
Forecast the assert values using the current trend;
Perform a forecast quality evaluation and accept the forecast if it meets
the threshold for quality;
Re-compute the assert probabilities based on the forecast data;
}
```

In accordance with an embodiment, the trend forecasts can be performed using standard time series forecasting techniques such as ARIMA. In accordance with an embodiment, the assert is modified to account for weekends and public holidays.

FIG. 18 illustrates a flowchart of a method for generation, validation, and maintenance of dynamic data-driven asserts, in accordance with an embodiment.

As illustrated in FIG. 18, in accordance with an embodiment, at step 272, a process is used to generate one or more asserts for use with loading of data from a source customer applications or transactional database environment, such as, for example, a process as described above with regard to FIG. 14.

At step 274, the asserts are validated against the data, for example in accordance with an embodiment by computing a number of instances (e.g., customers) for which a particular assert was violated, and if the number is above a particular threshold (e.g., 25% of instances or customers), then the assert is updated or modified to include any otherwise offending values.

At step 276, the modified asserts are executed against the data; and if, for example, the number of instances (e.g., customers) for which a particular assert was violated is seen to decrease, then the modified assert is accepted.

At step 278, asserts are maintained or updated on an ongoing basis by, for example, forecasting assert values using a current trend; performing a forecast quality evaluation; and accepting the forecast if it meets a threshold for quality; and/or re-computing the assert probabilities based on the forecast data.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with enterprise software applications components such as Oracle Fusion Applications; cloud environments such as Oracle Cloud Infrastructure; and cloud services such as Oracle Fusion Analytics; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with an analytic applications environment, for automatic generation of asserts comprising:
   a computer including one or more processors, that provides access by an analytic applications environment to a data warehouse for storage of data by a plurality of tenants, wherein the data warehouse is associated with an analytic applications schema;
   wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant;
   wherein during loading of the data to the data warehouse by a data pipeline, one or more asserts associated with warehouse data are automatically generated, based on an evaluation of the data received from the enterprise application or database environment, wherein the data pipeline comprises a shared data pipeline having one or more common transformation maps or repositories, and the shared data pipeline comprises data values across multiple customer data warehouses associated with a data set including a rule and that are compared to confirm a correctness of the rule and automatically generate the one or more asserts using the one or more common transformation maps or repositories in response to confirming the correctness of the rule; and
   wherein one or more of validation and/or updates to generated asserts are performed, upon receipt of data from the enterprise application or database environment.

2. The system of claim 1, wherein the evaluation of the data received from the enterprise application or database environment includes an evaluation that columns of the received data include integer values and are one of strictly sequential, cyclic, or non-negative values.

3. The system of claim 1, wherein the evaluation of the data received from the enterprise application or database environment, and automatic generation of asserts associated with the warehouse data, includes identifying asserts for received data having floating point values.

4. The system of claim 1, wherein the generating of asserts associated with warehouse data, based on an evaluation of the data received from the enterprise application or database environment, includes a marking of one or more asserts as mutable or immutable.

5. The system of claim 1, wherein the generating of asserts associated with warehouse data, based on an evaluation of the data received from the enterprise application or database environment, includes associating and updating confidence values with one or more of the asserts.

6. The system of claim 1, wherein the continuing to perform one or more of validation and/or updates to generated asserts includes validating the asserts in response to receipt of additional or changed data from the enterprise application or database environment.

7. The system of claim 1, wherein the continuing to perform one or more of validation and/or updates to generated asserts includes updating asserts in response to receipt of additional or changed data from the enterprise application or database environment.

8. The system of claim 1, comprising:
   modeling probabilities of historic values of data stored in the data warehouse;
   determining a value in the data received from the enterprise application or database environment that is not present within the historic values of the data; and
   determining, using kernel density estimation (KDE) or other means, a probability that a received value is one of lower than, or exceeds, a predetermined threshold for the data, for use in generating an assert associated with the received value.

9. The system of claim 1, wherein the computer environment maintains, for a plurality of tenants (customers) of the environment:
   a data warehouse instance associated with each tenant, including a first data warehouse instance associated with a first tenant, and a second data warehouse instance associated with a second tenant; and
   an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

10. The system of claim 1, wherein each tenant and data warehouse instance is additionally associated with a customer schema, including:
    a first customer schema associated with the first tenant and first data warehouse instance; and
    a second customer schema associated with the second tenant and second data warehouse instance;
    wherein the contents of the particular data warehouse instance are controlled by the data pipeline or other processing component operating automatically in accordance with the analytics schema, and by the customer schema associated with the particular data warehouse instance.

11. A method for use with an analytic applications environment, for automatic generation of asserts comprising:
providing, at a computer including one or more processors, access by an analytic applications environment to a data warehouse for storage of data by a plurality of tenants, wherein the data warehouse is associated with an analytic applications schema;
wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant; and
during loading of the data to the data warehouse by a data pipeline, automatically generating one or more asserts associated with warehouse data, based on an evaluation of the data received from the enterprise application or database environment, wherein the data pipeline comprises a shared data pipeline having one or more common transformation maps or repositories, wherein the shared data pipeline comprises data values across multiple customer data warehouses associated with a data set including a rule and that are compared to confirm a correctness of the rule and automatically generate the one or more asserts using the one or more common transformation maps or repositories in response to confirming the correctness of the rule; and
performing one or more of validation and/or updates to generated asserts, upon receipt of data from the enterprise application or database environment.

12. The method of claim 11, wherein the evaluation of the data received from the enterprise application or database environment includes an evaluation that columns of the received data include integer values and are one of strictly sequential, cyclic, or non-negative values; or identifying asserts for received data having floating point values.

13. The method of claim 11, wherein the generating of asserts associated with warehouse data, based on an evaluation of the data received from the enterprise application or database environment, includes a marking of one or more asserts as mutable or immutable.

14. The method of claim 11, wherein the generating of asserts associated with warehouse data, based on an evaluation of the data received from the enterprise application or database environment, includes associating and updating confidence values with one or more of the asserts.

15. The method of claim 11, wherein the continuing to perform one or more of validation and/or updates to generated asserts includes validating the asserts in response to receipt of additional or changed data from the enterprise application or database environment.

16. The method of claim 11, wherein the continuing to perform one or more of validation and/or updates to generated asserts includes updating asserts in response to receipt of additional or changed data from the enterprise application or database environment.

17. The method of claim 11, comprising:
modeling probabilities of historic values of data stored in the data warehouse;
determining a value in the data received from the enterprise application or database environment that is not present within the historic values of the data; and
determining, using kernel density estimation (KDE) or other means, a probability that a received value is one of lower than, or exceeds, a predetermined threshold for the data, for use in generating an assert associated with the received value.

18. The method of claim 11, wherein the computer environment maintains, for a plurality of tenants (customers) of the environment:
a data warehouse instance associated with each tenant, including a first data warehouse instance associated with a first tenant, and a second data warehouse instance associated with a second tenant; and
an analytics schema associated with each data warehouse instance, that enables data to be loaded automatically, by the data pipeline or other processing component, to a particular data warehouse instance in accordance with the analytics schema, to pre-populate the data warehouse instance with business intelligence or analytics data retrieved from an associated tenant enterprise application or database environment.

19. The method of claim 11, wherein each tenant and data warehouse instance is additionally associated with a customer schema, including:
a first customer schema associated with the first tenant and first data warehouse instance; and
a second customer schema associated with the second tenant and second data warehouse instance;
wherein the contents of the particular data warehouse instance are controlled by the data pipeline or other processing component operating automatically in accordance with the analytics schema, and by the customer schema associated with the particular data warehouse instance.

20. A non-transitory computer readable storage medium having instructions thereon, which when read and executed by a computer including one or more processors cause the computer to perform a method comprising:
providing access by an analytic applications environment to a data warehouse for storage of data by a plurality of tenants, wherein the data warehouse is associated with an analytic applications schema;
wherein each tenant of the plurality of tenants is associated with a customer tenancy, and a customer schema for use by the tenant in populating a data warehouse instance, wherein data associated with a particular tenant is provisioned in the data warehouse instance associated with, and accessible to, the particular tenant, in accordance with the analytic applications schema and the customer schema associated with the particular tenant; and
during loading of the data to the data warehouse by a data pipeline, automatically generating one or more asserts associated with warehouse data, based on an evaluation of the data received from the enterprise application or database environment, wherein the data pipeline comprises a shared data pipeline having one or more common transformation maps or repositories, and the shared data pipeline comprises data values across multiple customer data warehouses associated with a data set including a rule and that are compared to confirm a correctness of the rule and automatically generate the one or more asserts using the one or more common transformation maps or repositories in response to confirming the correctness of the rule; and
performing one or more of validation and/or updates to generated asserts, upon receipt of data from the enterprise application or database environment.

* * * * *